United States Patent
Kim et al.

(10) Patent No.: US 12,336,015 B2
(45) Date of Patent: *Jun. 17, 2025

(54) METHOD FOR PERFORMING RANDOM ACCESS PROCEDURE AND APPARATUS THEREFOR

(71) Applicant: LG Electronics Inc., Seoul (KR)

(72) Inventors: Jaehyung Kim, Seoul (KR); Joonkui Ahn, Seoul (KR); Seokmin Shin, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,275

(22) Filed: Jun. 27, 2023

(65) Prior Publication Data

US 2023/0345544 A1  Oct. 26, 2023

Related U.S. Application Data

(63) Continuation of application No. 17/540,700, filed on Dec. 2, 2021, now Pat. No. 11,729,834, which is a continuation of application No. 16/496,734, filed as application No. PCT/KR2018/003356 on Mar. 22, 2018, now Pat. No. 11,212,841.

(60) Provisional application No. 62/475,836, filed on Mar. 23, 2017.

(51) Int. Cl.
*H04W 4/00* (2018.01)
*H04W 74/00* (2009.01)
*H04W 74/0833* (2024.01)

(52) U.S. Cl.
CPC ..... *H04W 74/0833* (2013.01); *H04W 74/004* (2013.01); *H04W 74/006* (2013.01)

(58) Field of Classification Search
CPC H04W 74/08; H04W 74/006; H04W 74/0833
See application file for complete search history.

(56) References Cited

U.S. PATENT DOCUMENTS

| | | | | |
|---|---|---|---|---|
| 2010/0296467 A1* | 11/2010 | Pelletier | ........... | H04L 5/0048 370/329 |
| 2011/0299492 A1* | 12/2011 | Lee | ........... | H04W 74/002 370/329 |
| 2014/0016534 A1* | 1/2014 | Kim | ........... | H04W 74/0833 370/312 |
| 2014/0362794 A1* | 12/2014 | Zhao | ........... | H04W 74/0858 370/329 |
| 2015/0023281 A1* | 1/2015 | Wu | ........... | H04W 72/21 370/329 |

(Continued)

*Primary Examiner* — Elisabeth Benoit Magloire
(74) *Attorney, Agent, or Firm* — Fish & Richardson P.C.

(57) ABSTRACT

The present invention relates to a method for performing a random access procedure in a wireless communication system and an apparatus therefor, the method comprising the steps of: receiving a physical downlink control channel (PDCCH) order, which indicates initiation of a random access procedure, from a base station; transmitting a random access preamble to the base station; and receiving a random access response message from the base station, wherein the step of receiving the random access response message comprises receiving downlink data together with the random access response message when the PDCCH order indicates downlink data transmission in Msg2.

11 Claims, 17 Drawing Sheets

(56) References Cited

U.S. PATENT DOCUMENTS

| | | | |
|---|---|---|---|
| 2015/0223181 A1* | 8/2015 | Noh | H04W 52/50 370/329 |
| 2015/0326995 A1* | 11/2015 | Li | H04W 72/51 370/329 |
| 2016/0081105 A1* | 3/2016 | Mizusawa | H04J 11/005 370/329 |
| 2016/0192398 A1* | 6/2016 | Wang | H04L 5/0026 370/329 |
| 2017/0311344 A1* | 10/2017 | Lee | H04W 74/0833 |
| 2018/0077696 A1* | 3/2018 | Lee | H04W 72/02 |
| 2018/0139783 A1* | 5/2018 | Park | H04W 74/0833 |
| 2022/0159740 A1* | 5/2022 | Xiong | H04W 72/0453 |

* cited by examiner

FIG. 1
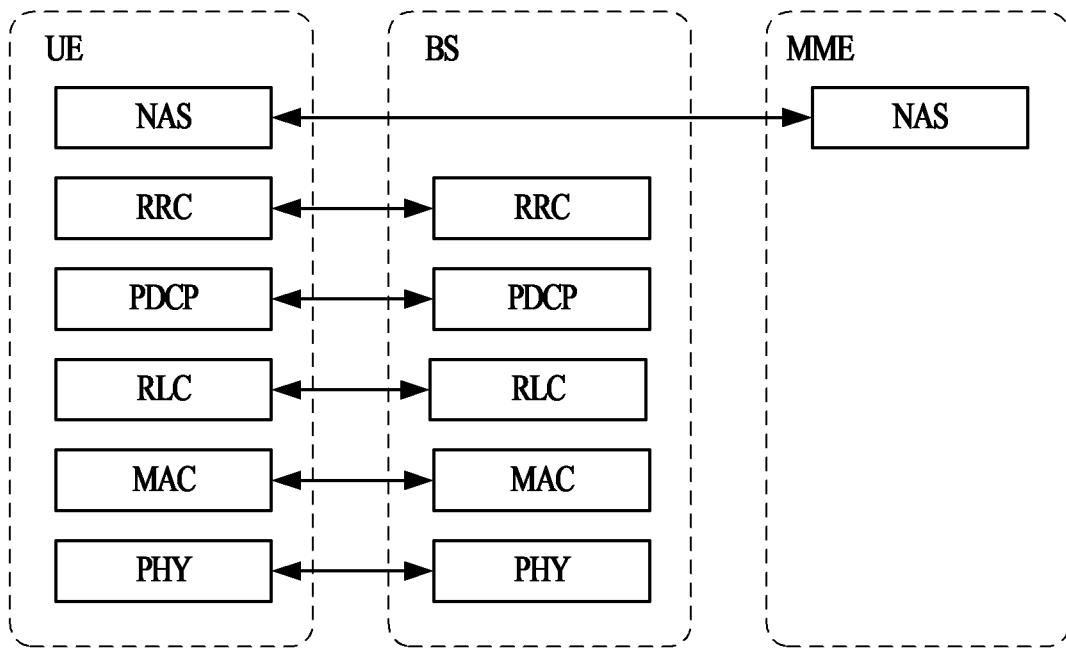
(a) Control plane protocol stack
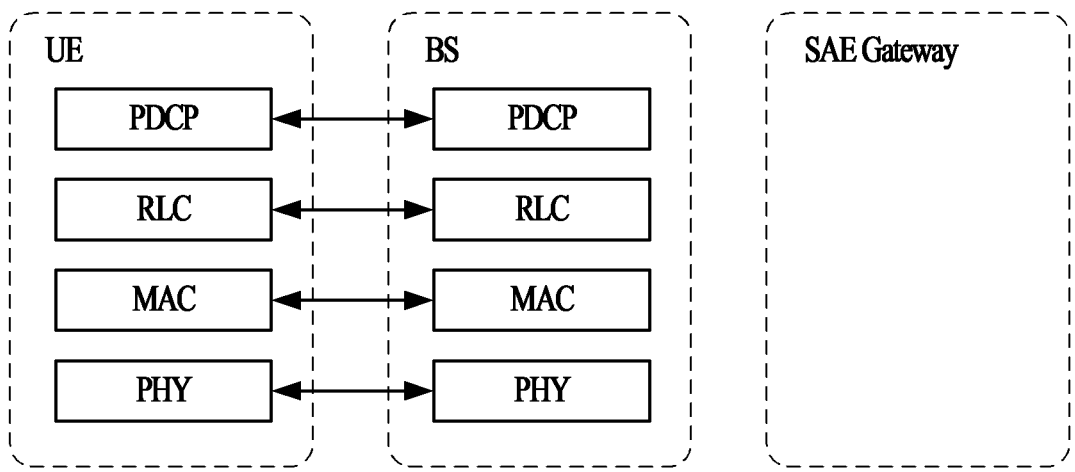
(b) User plane protocol stack

METHOD FOR PERFORMING RANDOM ACCESS PROCEDURE AND APPARATUS THEREFOR

CROSS-REFERENCE TO RELATED APPLICATIONS

This application is a continuation of U.S. application Ser. No. 17/540,700, filed on Dec. 2, 2021, which is a continuation of U.S. application Ser. No. 16/496,734, filed on Sep. 23, 2019, now U.S. Pat. No. 11,212,841, which is a National Stage application under 35 U.S.C. § 371 of International Application No. PCT/KR2018/003356, filed on Mar. 22, 2018, which claims the benefit of U.S. Provisional Application No. 62/475,836, filed on Mar. 23, 2017. The disclosures of the prior applications are incorporated by reference in their entirety.

TECHNICAL FIELD

The present invention relates to a wireless communication system. More specifically, the present invention relates to a method and apparatus for performing a random access procedure for efficiently transmitting and receiving data.

BACKGROUND

When a new radio access technology (RAT) system is introduced, as more and more communication devices require larger communication capacity, there is a need for improved mobile broadband communication as compared to existing RAT. In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, considering enhanced mobile broadband communication (eMBB), massive MTC (mMTC), URLLC (Ultra-Reliable Low-Latency Communication), etc, the next generation wireless access technology is being discussed, and such a technology is referred to as new RAT (NR) for convenience.

SUMMARY

An object of the present invention is to provide a method and apparatus for performing a random access process for efficiently transmitting and receiving data in a wireless communication system. Specifically, an object of the present invention to provide a method and apparatus for performing a random access process for efficiently transmitting and receiving uplink/downlink data in a wireless communication system that supports narrowband Internet of Things (NB-IoT) communication.

It will be understood by persons skilled in the art that the objects that can be achieved with the present invention are not limited to what has been particularly described hereinabove and other objects that the present invention can achieve will be more clearly understood from the following detailed description.

In a first aspect of the present invention, provided herein is a method for performing a random access procedure by a user equipment in a wireless communication system, the method comprising: receiving a physical downlink control channel (PDCCH) order indicating an initiation of the random access procedure from a base station; transmitting a random access preamble to the base station; and receiving a random access response message from the base station, wherein receiving the random access response message comprises: receiving downlink data along with the random access response message when the PDCCH order indicates a downlink data transmission in a Msg2.

In a second aspect of the present invention, provided herein is a user equipment for performing a random access procedure in a wireless communication system, the user equipment comprising: a radio frequency (RF) transceiver; and a processor operatively connected to the RF transceiver, wherein the processor is configured to: receive a physical downlink control channel (PDCCH) order indicating an initiation of the random access procedure from a base station; transmit a random access preamble to the base station; and receive a random access response message from the base station, wherein receiving the random access response message comprises: receiving downlink data along with the random access response message when the PDCCH order indicates a downlink data transmission in a Msg2.

Preferably, when the PDCCH order is detected using a specific Radio Network Temporary Identifier (RNTI), the PDCCH order may indicate the initiation of the random access procedure and the downlink data transmission in the Msg2.

Preferably, the specific RNTI may have one of hexadecimal values from FFF4 to FFF9.

Preferably, when the PDCCH order is received using a Cell-RNTI (C-RNTI), the downlink data transmission in the Msg2 may be skipped.

Preferably, when the PDCCH order is received using a Cell Radio Network Temporary Identifier (C-RNTI), and at least one reserved bit of downlink control information received through the PDCCH order is configured to have a specific value, the PDCCH order may indicate the initiation of the random access procedure and the downlink data transmission in the Msg2.

Preferably, the received downlink control information may be DCI format 1A, and the specific value may be 1.

Preferably, the received downlink control information may be DCI format N1, and the specific value may be 0.

Preferably, the downlink data may comprise user data of an application layer.

Preferably, the downlink data may be transferred to the application layer through a dedicated traffic channel (DTCH).

According to the present invention, data may be efficiently transmitted and received through a random access procedure in a wireless communication system. Specifically, according to the present invention, data may be efficiently transmitted and received through a random access procedure in a wireless communication system that supports narrowband Internet of Things (NB-IoT) communication.

It will be understood by persons skilled in the art that the objects that can be achieved with the present invention are not limited to what has been particularly described hereinabove and other objects that the present invention can achieve will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 1 illustrates a control plane and a user plane of a radio interface protocol

DETAILED DISCLOSURE

Figure 2:
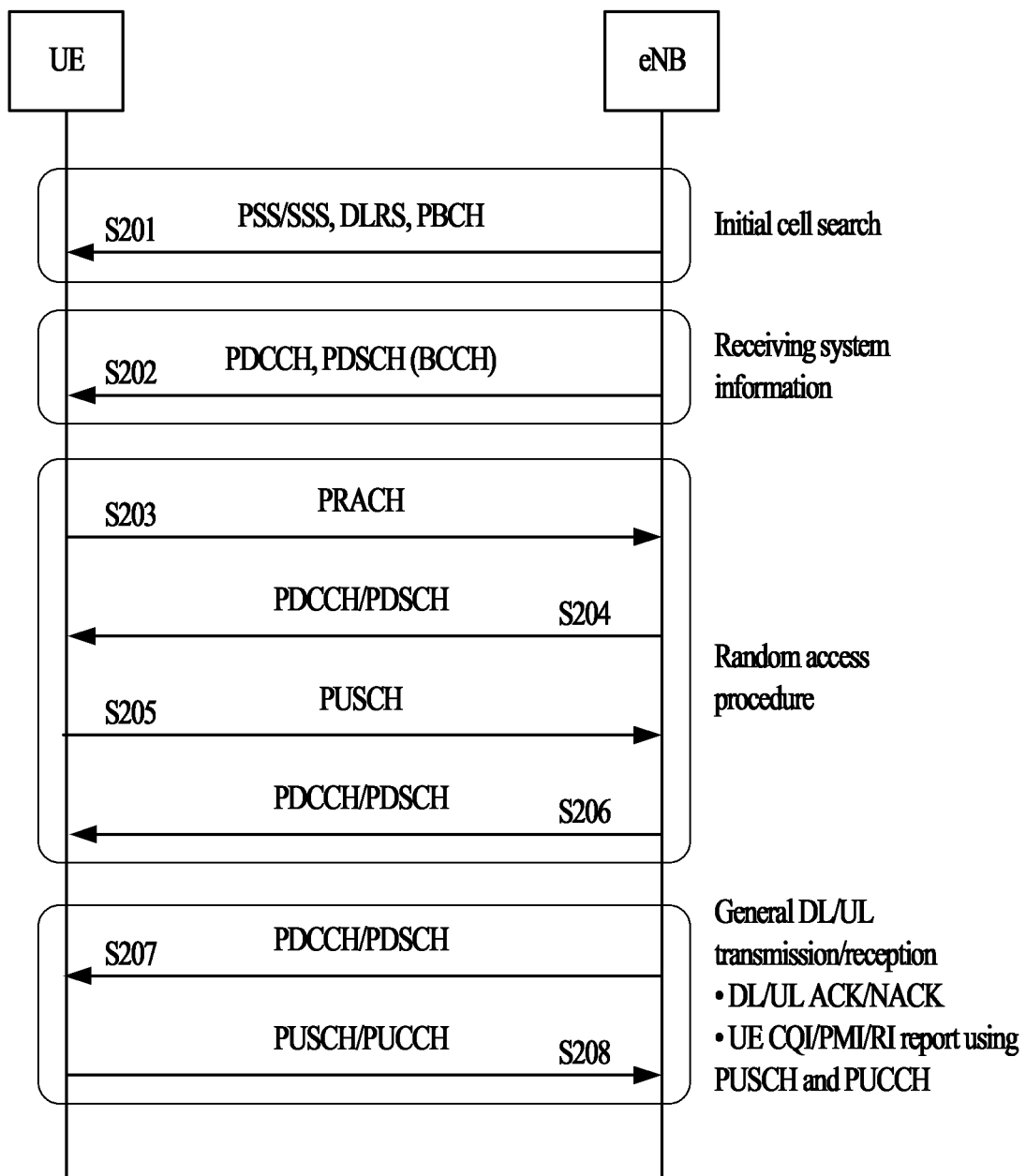
FIG. 2 illustrates physical channels and a general method for transmitting signals using the physical channels that may be used in the present invention.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access network (UTRAN) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRAN (E-UTRAN). UTRAN is a part of universal mobile telecommunications system (UMTS). 3rd generation partnership project (3GPP) long term evolution (LTE) is a part of E-UMTS (Evolved UMTS), which uses E-UTRAN. LTE-Advanced (LTE-A) is an evolved version of 3GPP LTE.

For clarity of explanations, the following description focuses on 3GPP LTE/LTE-A system. However, technical principles of the present invention are not limited thereto. Further, a particular terminology is provided for better understanding of the present invention. However, such a particular terminology may be changed without departing from the technical principles of the present invention. For example, the present invention may be applied to a system in accordance with a 3GPP LTE/LTE-A system as well as a system in accordance with another 3GPP standard, IEEE 802.xx standard, 3GPP2 standard, or a next-generation communication standard.

In the present specification, a user equipment (UE) may be fixed or mobile, and may be various kinds of equipment that transmit and receive data and/or control information to communicate with a base station (BS). The UE may be referred to as a terminal, mobile station (MS), mobile terminal (MT), user terminal (UT), subscribe station (SS), wireless device, personal digital assistant (PDA), wireless modem, handheld device, etc. In the present specification, a UE may be interchangeably referred to as a terminal.

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present specification, a base station (BS) may be interchangeably referred to as an eNB.

FIG. 1 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

In a wireless access system, a user equipment (UE) may receive information from a base station (BS) in downlink (DL) and transmit information in uplink (UL). The information transmitted or received by the UE may include data and various control information. In addition, there are various physical channels according to the type or use of the information transmitted or received by the UE.

FIG. 2 illustrates physical channels and a general method for transmitting signals on the physical channels in the present invention.

When a UE is powered on or enters a new cell, the UE performs initial cell search in step S201. The initial cell search involves acquisition of synchronization to a base station. To this end, the UE synchronizes its timing to the base station and acquires information such as a cell identifier (ID) by receiving a primary synchronization signal (PSS) and a secondary synchronization signal (SSS) from the base station. Then the UE may acquire system information broadcasted in the cell through a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

To complete access to the base station, the UE may perform a random access procedure such as steps S203 to S206 with the base station. To this end, the UE may transmit a preamble on a physical random access channel (PRACH) (S203) and may receive a response message to the preamble on a PDCCH and a PDSCH associated with the PDCCH (S204). In the case of a contention-based random access, the UE may additionally perform a contention resolution procedure including transmission of an additional PRACH (S205) and reception of a PDCCH signal and a PDSCH signal corresponding to the PDCCH signal (S206).

After the above procedure, the UE may receive a PDCCH and/or a PDSCH from the base station (S207) and transmit a physical uplink shared channel (PUSCH) and/or a physical uplink control channel (PUCCH) to the base station (S208), in a general UL/DL signal transmission procedure. Information that the UE transmits to the base station is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 3:
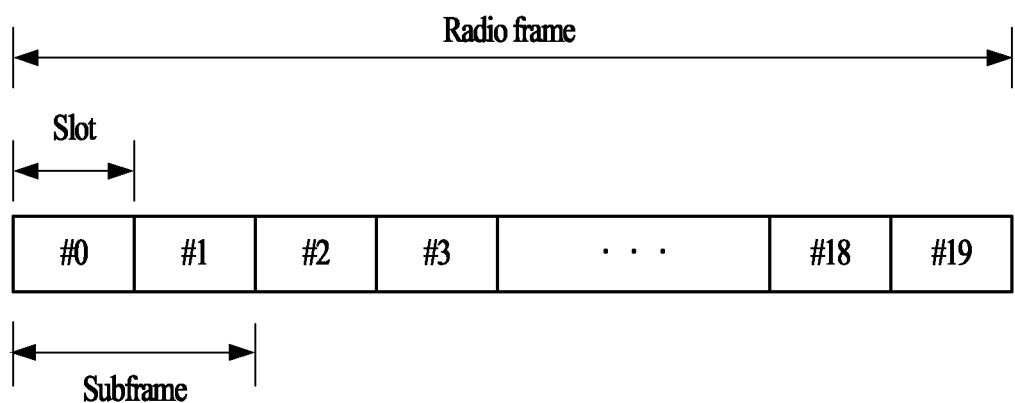
FIG. 3 illustrates a structure of a radio frame that may be used in the present invention.

FIG. 3 illustrates a structure of a radio frame that may be used in the present invention. In a cellular orthogonal frequency division multiplexing (OFDM) radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 3 illustrates the structure of the type-1 radio frame. For example, a downlink radio frame includes 10 subframes and one subframe includes two slots in a time domain. A time required to transmit one subframe is referred to as a transmission time interval (TTI). Or, TTI may refer to a time interval required to transmit one slot. For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol period. The OFDM symbol may be referred to as an SC-FDMA symbol or symbol period. A resource block (RB) as a resource allocation unit may include a plurality of consecutive subcarriers in one slot.

The number of OFDM symbols included in one slot may vary according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in a base station and to transmit a physical random access channel (PRACH) that carriers a random access preamble for uplink transmission synchronization. The GP is used to eliminate interference generated in uplink due to multi-path delay of a downlink signal between uplink and downlink.

The above-described radio frame structures are purely exemplary, and thus the number of subframes in a radio frame, the number of slots in a subframe, or the number of symbols in a slot may vary in different ways.

Figure 4:
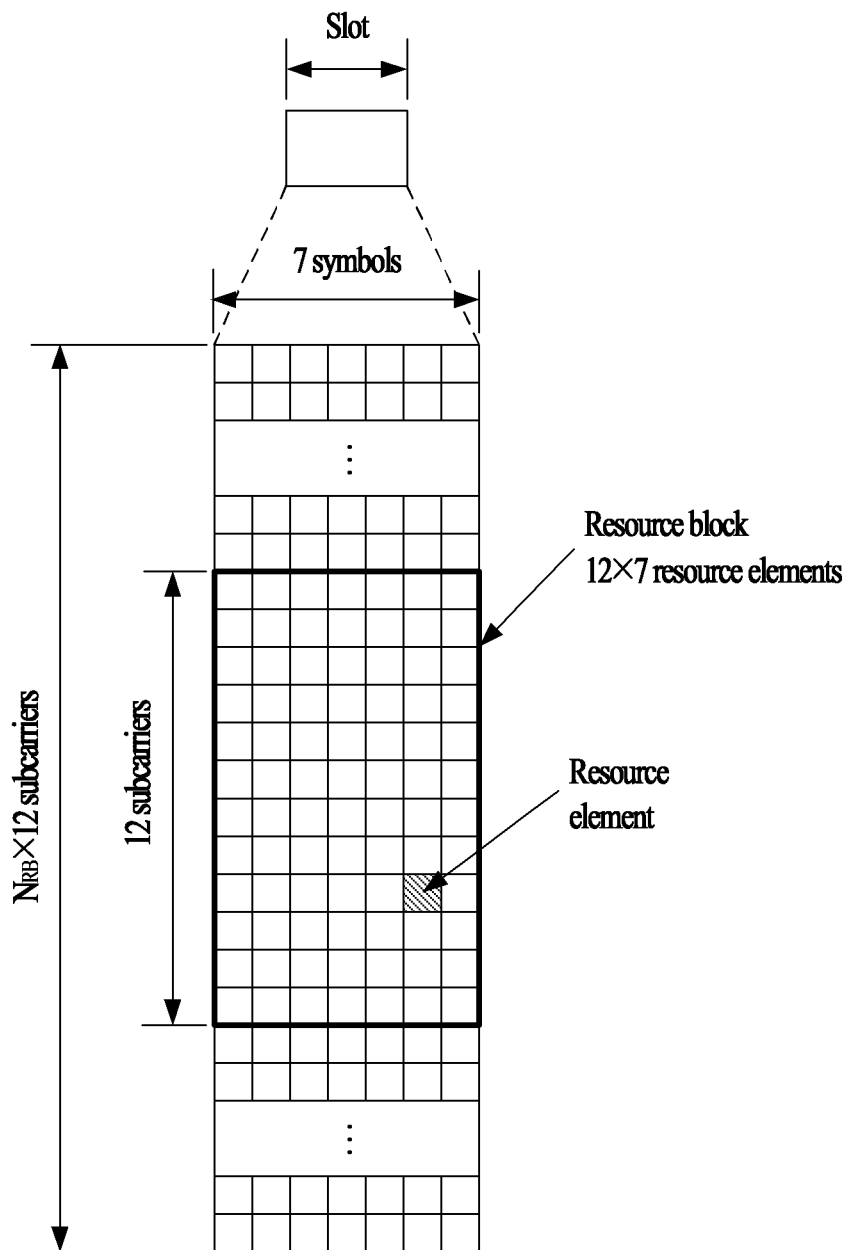
FIG. 4 illustrates a resource grid of a downlink slot that may be used in the present invention.

FIG. 4 illustrates a resource grid of one downlink slot that may be used in the present invention.

Referring to FIG. 4, a downlink slot includes a plurality of OFDM symbols in the time domain. One downlink slot may include 7 OFDM symbols and a resource block (RB) may include 12 subcarriers in the frequency domain. However, the present invention is not limited thereto. Each element of the resource grid is referred to as a Resource Element (RE). One RB includes 12×7 REs. The number of RBs in a DL slot, NAL, depends on a downlink transmission bandwidth. An uplink slot may have the same structure as a downlink slot.

The above-described resource grid of a slot is exemplary, and thus the number of symbols, the number of resource elements, the number of RBs included in the slot may vary in different ways.

Figure 5:
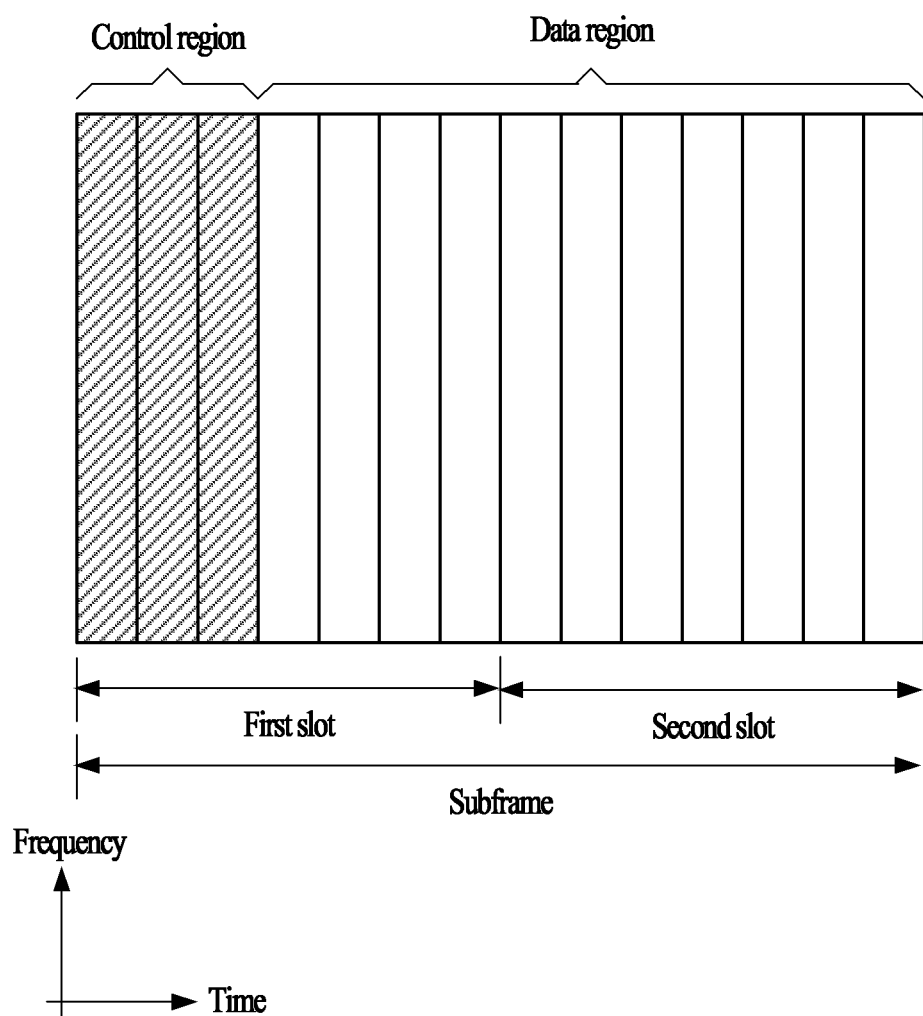
FIG. 5 illustrates a downlink subframe structure that may be used in the present invention.

FIG. 5 illustrates a downlink subframe structure that may be used in the present invention.

Referring to FIG. 5, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs), and each REG is uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ ACK/NACK signal. The PHICH is allocated on the remaining REGs other than CRS and PCFICH (a first OFDM symbol) in one or more OFDM symbols configured by PHICH duration. The PHICH is allocated to three REGs that are distributed if possible on the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A base station determines a PDCCH format according to control information to be transmitted to a UE, and attaches a cyclic redundancy check (CRC) to the control information for error detection. CRC is masked with an identifier (e.g. radio network temporary identifier (RNTI)) according to an owner or usage of the PDCCH. In other words, PDCCH is CRC-scrambled with an identifier (e.g. RNTI).

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH. For example, in the case where the PDCCH is de-masked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in a search space for a specific UE, the remaining CCEs are not present. Thus, a base station may not find CCE resources in which the PDCCH is to be transmitted to all available UEs in a given subframe. In order to minimize the possibility that such blocking is subsequent to a next subframe, a start position of the USS is UE-specifically hopped.

Figure 6:
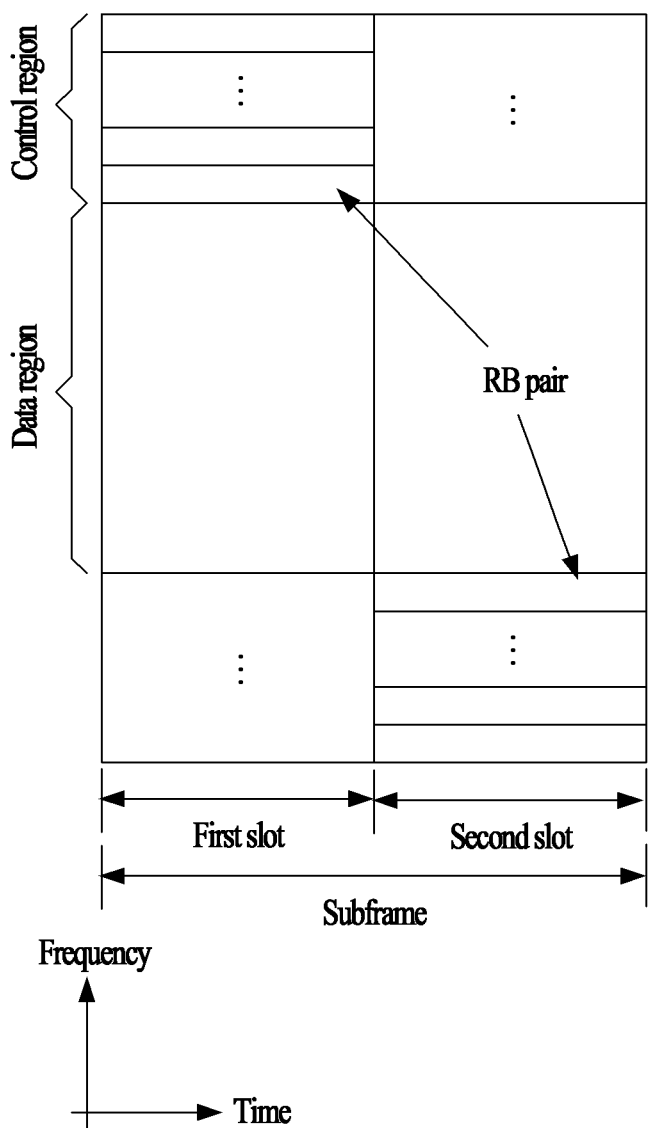
FIG. 6 illustrates an uplink subframe structure that may be used in the present invention.

FIG. 6 illustrates an exemplary structure of an uplink subframe that may be used in the present invention.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0,1,2,3) located at both ends of the data region on a frequency axis, and performs hopping on the border of the slots.

The PUCCH may be used to transmit the following control information.

SR (Scheduling Request): information used to request uplink UL-SCH resource. The SR is transmitted using an on-off keying (OOK) scheme.

HARQ ACK/NACK: a response signal to the PDCCH indicating semi-persistent scheduling (SPS) release and a downlink data packet on the PDSCH. HARQ ACK/NACK represents whether the PDCCH indicating SPS release or the downlink data packet has been successfully received. ACK/NACK 1 bit is transmitted in response to a single downlink codeword (CW), and ACK/NACK 2 bits are transmitted in response to two downlink codewords.

CQI (Channel Quality Indicator): feedback information on a downlink channel. MIMO (Multiple Input Multiple Output) related feedback information includes a rank indicator (RI) and a precoding matrix indicator (PMI). 20 bits per subframe are used.

The above-described radio frame structures are purely exemplary, and thus the number of subframes in a radio frame, the number of slots in a subframe, or the number of symbols in a slot may vary in different ways.

Figure 7:
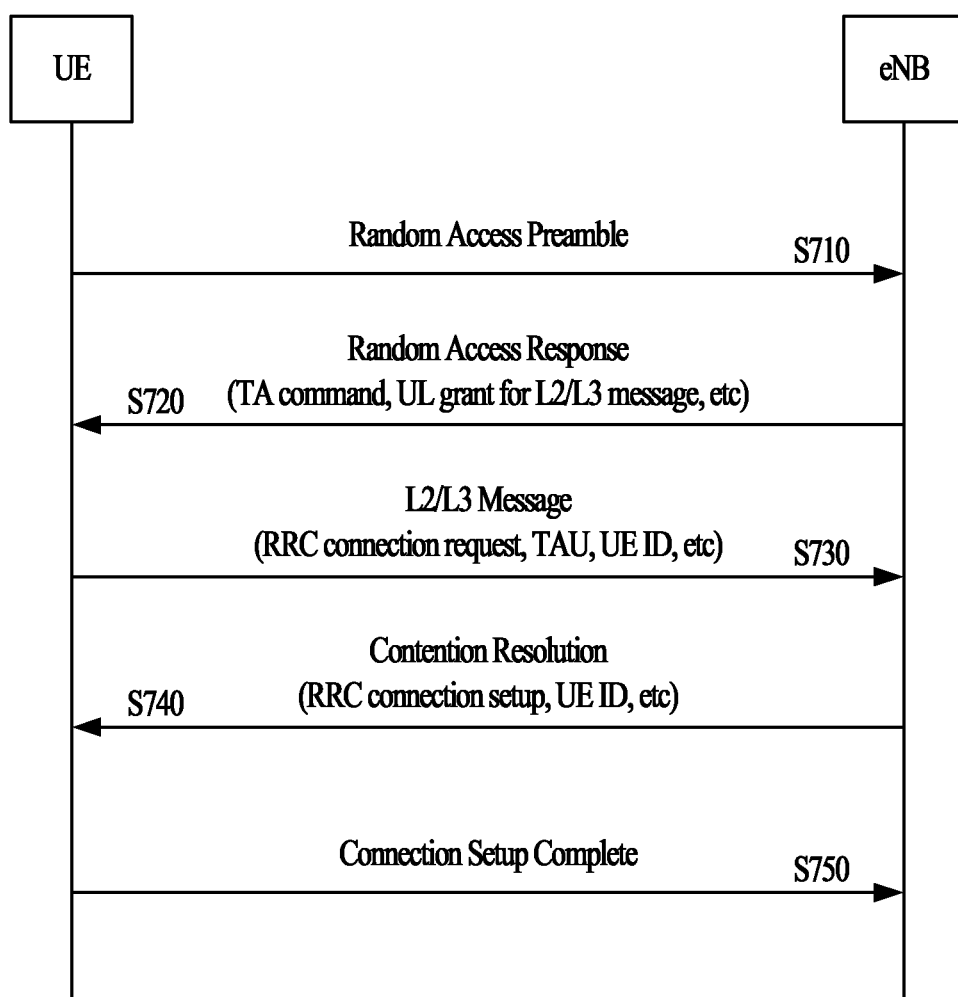
FIG. 7 illustrates a random access procedure.

FIG. 7 illustrates a random access procedure.

The random access procedure is used to transmit short-length data in uplink. For example, the random access procedure is performed upon initial access in an RRC_IDLE mode, upon initial access after radio link failure, upon handover requiring the random access procedure, and upon the occurrence of uplink/downlink data requiring the random access procedure during an RRC_CONNECTED mode. Some RRC messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 7, a UE receives and stores information regarding random access from a base station through system information. Thereafter, when random access is needed, the UE transmits a random access preamble (referred to as Message 1) to the base station (S710). Upon receiving the random access preamble from the UE, the base station transmits a random access response message (referred to as Message 2) to the UE (S720). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3) through an uplink Shared Channel (SCH) according to radio resource allocation information included in the response information (S730). After receiving the uplink message from the UE, the base station transmits a message for contention resolution (referred to as Message 4) to the UE (S740). After the UE receives the contention resolution message, the UE transmits a connection setup complete message (referred to as Message 5 or Msg5) to the base station (S750).

In case of a non-contention based procedure, a base station may allocate a non-contention random access preamble to a UE before the UE transmits a random access preamble (S710). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S710. If the base station receives the non-contention random access preamble from the UE, the base station may transmit a random access response (referred to as Message 2) to the UE in a similar manner as S720.

During the above-described random access procedure, HARQ may not be applied to a random access response (S720), but HARQ may be applied to an uplink transmission for the random access response or a message for contention resolution. Thus, the UE does not have to transmit ACK/NACK in response the random access response.

A next generation of LTE-A system is considering to configure a user equipment (UE) at a low cost/low specification mainly focusing on data communication such as metering of a gauge meter, measurement of a water level, utilization of a monitoring camera, inventory report of a vending machine, and the like. Such a UE is to provide appropriate throughputs between connected devices even though it has a low complexity and consumes low power, and the UE is referred to as a machine type communication (MTC) UE or IoT (Internet of Things) UE for convenience, and the UE may be briefly referred to as a user equipment (UE).

Further, when the next generation system utilizes a cellular network or a third-party network, the next generation system can perform communication using a narrow band (or NB-IoT communication). For example, the narrow band may be 180 kHz. A UE (or NB-IoT UE) or an eNB transmits a single channel or a plurality of physical channels by multiplexing the channel(s) in a corresponding region. Meanwhile, the NB-IoT UE can perform communication even in such an area where channel environment is poor as under a bridge, under the sea, on the sea, and the like. In this case, in order to compensate for the poor channel environment, the NB-IoT UE may perform repetitive transmission on a specific channel (e.g., repetitive transmission during several TTIs) and/or perform power boosting. As an example of the power boosting, a region of a frequency resource to be transmitted on a specific band is more reduced to concentrate power per hour on a specific resource. For example, when a specific channel is transmitted via an RB (resource block) consisting of 12 REs, it may concentrate power to be distributed via the entire RB on a specific RE(s) by allocating the power to the specific RE instead of RE allocation in an RB unit. In particular, a scheme of performing communication by concentrating data and power on a single RE belonging to an RB is commonly referred to as a single-tone transmission scheme.

The physical channel for NB-IoT may be referred to by adding 'N', which represents narrowband, to the physical channel of the legacy system. For example, the PUSCH for NB-IoT may be referred to as a narrowband physical uplink shared channel (NPUSCH), the PRACH for NB-IoT may be referred to as a narrowband physical random access channel (NPRACH), and the PBCH for NB-IoT may be referred to as a narrowband physical broadcast channel (NPBCH), the PDCCH for NB-IoT may be referred to as a narrowband physical downlink control channel (NPDCCH), and the PDSCH for NB-IoT may be referred a narrowband physical downlink shared channel (NPDSCH). For simplicity, the NPUSCH, NPRACH, NPBCH, NPDCCH, and NPDSCH may be interchangeably used with PUSCH, PRACH, PBCH, PDCCH, and PDSCH, respectively. NB-IoT may be interchangeably used with cellular IoT (or cIoT).

The present invention is described based on UEs/base stations/systems supporting NB-IoT, but is not limited thereto. The present invention may also be applied to UEs/base stations/systems that do not support NB-IoT communication. For example, the present invention is applicable to a typical UE/base station/system that does not support IoT and MTC as well as a UE/base station/system supporting massive machine type communication (mMTC). In the present disclosure, the term UE/base station/system may collectively refer to a UE/base station/system supporting NB-IoT and a UE/base station/system that does not support NB-IoT.

Random Access Procedure for NB-IoT

The random access procedure for NB-IoT supports a 4-step contention-based random access procedure (or 4-step contention-based RACH procedure) similar to that of legacy LTE as described below. For example, the 4-step contention-based random access procedure may be performed through the operations described in FIG. 7 and the related section.

1) Msg1: Transmission of a random access (RA) preamble from the UE (for example, see step S710 of FIG. 7)

2) Msg2: Reception of a random access response (RAR) from the UE (e.g., see step S720 of FIG. 7). The RAR may include a timing advance (TA) command, and UL grant information for transmission of an L2/L3 message. The UL grant information may be used for (N)PUSCH transmission in the Msg3 step and may be referred to as (N)PUSCH grant information.

3) Msg3: Transmission of an L2/L3 message from the UE (e.g., see step S730 of FIG. 7). The L2/L3 message may include an RRC connection request, Tracking Area Update (TAU) information, and UE identification information (or UE ID).

4) Msg4: Reception of a contention resolution message by the UE (e.g., see step S740 of FIG. 7). The contention resolution message may include an RRC connection setup and UE identification information (or UE ID).

5) Msg5: Transmission of an RRC connection setup complete message from the UE (e.g., see S750 of FIG. 7). The RRC connection setup complete message may include Hybrid Automatic Repeat and Request Acknowledgement (HARQ-ACK) information about Msg4 and UE identification information (or UE ID).

The standard specifications after 3rd Generation Partnership Project (3GPP) Release-13 support NB-IoT communication. In order to prevent the network load from being caused in NB-IoT communication, to support low-power and low-cost UEs, and to efficiently support intermittent data transmission, the standard specifications after 3GPP Release-13 support various standard technologies. For example, the standard specifications after 3GPP Release-13 support repetitive transmission of a physical channel for coverage enhancement or coverage extension with radio access technology between an NB-IoT UE and a base station, and also support core network optimization technology for intermittent data transmission and reception by an NB-IoT UE dedicated to voice-unsupported data as core network technology.

As an example, the core network optimization technology supports the following two types of random access procedures for NB-IoT, considering even system enhancement of the Evolved Packet System (EPS) for NB-IoT.

Control Plane EPS Optimization

1) Msg1: Transmission of an RA preamble
2) Msg2: RAR (including a TA command and Msg3 scheduling information)
3) Msg3: RRC connection request
4) Msg4: RRC connection setup
5) Msg5: RRC connection setup complete (including NAS PDU with data)

User Plane EPS Optimization

1) Msg1: Transmission of an RA preamble
2) Msg2: RAR (including TA command and Msg3 scheduling information)
3) Msg3: RRC connection resume request
4) Msg4: RRC connection resume
5) Msg5: RRC connection resume complete
6) (N)PUSCH (UL data): UL data transmission on PUSCH or NPUSCH When control plane EPS optimization is compared with user plane EPS optimization from the perspective of UL data transmission, the first UL data transmission may be performed in Msg5 in the case of control plane EPS optimization, and may be performed after Msg5 in the case of user plane EPS optimization.

In addition, from the perspective of repetitive transmission of a physical channel for coverage extension or coverage enhancement between an NB-IoT UE and a base station, an excessive latency may occur due to repetitive transmission of the physical channel. For example, in the case of UL transmission, repetitive transmission of the same signal may be performed up to 128 times, and a latency of about tens of seconds to several hundreds of seconds may occur until the transmission and reception of the UL data is completed. As another example, in the case of DL transmission, repetitive transmission of the same signal may be performed up to 2048 times. In this case, a latency of several tens of seconds to several hundred seconds may occur until the transmission and reception of DL data is completed.

Therefore, when an NB-IoT UE accesses a network through the conventional random access procedure and then performs data transmission and reception, an excessive latency may occur and power is required to be kept turned on for a long time due to the excessive latency. Accordingly, excessive power consumption may occur, which is a technical issue.

The present invention proposes a method for early transmission/reception of data through a random access procedure to address the technical issue described above. More specifically, the present invention is directed to a method for transmitting/receiving data early in a random access procedure in order to reduce latency and power consumption, which are main requirements for NB-IoT or massive machine type communication (mMTC). More specifically, as described above, in the conventional contention-based random access procedure, data transmission/reception is allowed only in or after Msg5. On the other hand, the present invention is intended to enable transmission/reception of UL data in or before Msg3 and transmission/reception of DL data in or before Msg4.

In the present disclosure, early UL data refers to UL data transmitted by a UE in or before Msg3 in a random access procedure, and early DL data refers to UL data transmitted before Msg4 in the random access procedure. In addition, in the present disclosure, DL HARQ-ACK refers to HARQ-ACK information transmitted from a UE to a base station for DL data, and UL HARQ-ACK refers to HARQ-ACK information transmitted from the base station to the UE for UL data.

Main scenarios considered in cellular IoT are described in detail in 3GPP Technical Report (TR) 45.820, which is incorporated herein by reference. The IoT traffic model defined in 3GPP TR 45.820 may be summarized as follows:
1) Mobile exception reports: used when a sensor reports occurrence of a specific event (fire/blackout/intrusion/disaster detection, etc.) to the base station (eNB);
2) Mobile periodic reports: used to periodically report the data (gas/water/electricity usage, etc.) measured by the sensor;
3) Network command: used for the application server to transmit a command instructing a UE to perform a specific operation (turning off light/reporting of measurement data) to the UE; and
4) Software (SW) update/reconfiguration: used when software update or patch transmission is needed for IoT devices In scenarios 1) and 2) among the main scenarios above, the UE initiate the scenarios and periodically or aperiodically reports UL data. In contrast, in scenarios 3) and 4), the base station (eNB) transmits DL data to the UE or commands the UE to report UL data. The present invention is directed to a method for transmitting DL data or additionally transmitting UL data during a random access procedure to reduce latency and power consumption in scenarios 3) and 4), which are initiated by the base station.

In order to effectively transmit and receive small packet data, the cellular IoT basically stays in a battery efficient state when there is no transmitted/received data, and transmits and receives data after switching to the RRC-CONNECTED mode through the random access procedure when necessary. For example, in NB-IoT, the RRC-IDLE or RRC-SUSPENDED mode corresponds to the battery efficiency state. As described above, in the case where data is transmitted and received after the random access procedure is completed as in the conventional cases, UL data is allowed to be transmitted and received in or after Msg5, and DL data is allowed to be transmitted and received after Msg5.

In order for the base station (eNB) to transmit DL data to a UE that is in the battery efficient state (e.g., RRC-IDLE or RRC-SUSPENDED) or to make a request to the UE for UL data transmission, a paging occasion configured for the UE is used. Paging refers to an operation used to derive an RRC connection from the UE which is in the RRC-IDLE state or announce change in system information to the UE which is in the RRC-IDLE state. Since there is no way for the base station to access the UE when the UE is in the RRC-IDLE state, the UE checks, at regular intervals, whether a paging message is transmitted on a paging occasion (e.g., a specific subframe) configured by the base station. When the paging message is transmitted, the UE checks whether the paging message includes information about the UE identification (or UE ID) thereof (e.g., SAE Temporary Mobile Subscriber Identity (S-TMSI) or International Mobile Subscriber Identity (IMSI)). The position of a time interval (e.g., subframe) for monitoring paging information configured between the base station and the UE for paging is referred to as a paging occasion (PO). The position of the paging occasion, which is UE-specific information, is determined by IMSI, which is a unique number of the UE.

The base station may use a paging occasion to transmit DL data or make a request for UL data transmission to the UE, and indicates an RRC connection setup to the UE by transmitting a paging message including UE identification (or UE ID) of the UE on the paging occasion. When the UE receives the paging message including the UE identification information (or UE ID) on the paging occasion, the UE may set up the RRC connection by performing the random access procedure illustrated in FIG. 7, and then transmit and receive DL/UL data. The present invention proposes methods for early UL data transmission/reception and/or early DL data transmission/reception in the respective steps of the random access procedure in order to reduce latency and power consumption when the base station transmits DL data or requests transmission of UL data by initiating the procedure.

Method 1: The Base Station (eNB) Provides an Indication and the UE Transmits Early UL Data During the Random Access Procedure Method 1-1: Transmitting Early UL Data in Msg1

In order for the network or base station to indicate UL data transmission while paging a UE in RRC-IDLE or RRC-SUSPENDED state, the base station may transmit the conventional Msg1 and (N)PUSCH grant information for UL data transmission simultaneously in transmitting a paging message. For example, the network or the base station may simultaneously designate (N)PRACH resource information and (N)PUSCH grant information for an idle UE (e.g., a UE in the RRC-IDLE or RRC-SUSPENDED mode).

Figure 8:
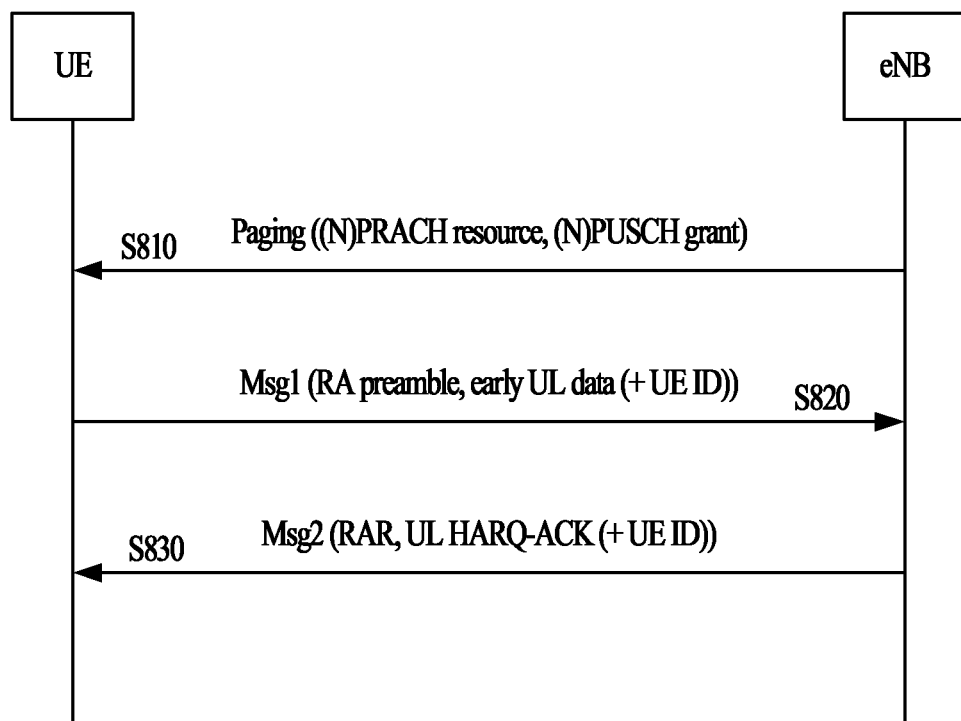
FIG. 8 to FIG. 16 illustrate random access procedures according to the present invention.

FIG. 8 illustrates a random access procedure (referred to as a first example for simplicity) in which a base station/UE transmits/receives (N)PRACH resource information and (N)PUSCH grant information in a paging step.

In step S810, the base station may transmit (N)PRACH resource information and (N)PUSCH grant information to the UE in the paging step. More specifically, on a paging occasion configured for the UE, the base station may transmit the (N)PRACH resource information and (N)PUSCH grant information to the UE through or along with the paging message. The (N)PRACH resource may include an (N)PRACH preamble transmission position in a time/frequency region used for (N)PRACH preamble transmission and a sequence used for the (N)PRACH preamble. The (N)PRACH resource information may refer to information indicating an (N)PRACH resource. The (N)PUSCH grant information may refer to scheduling information for (N)PUSCH transmission carrying early UL data.

The paging message may be transmitted to the UE on a PCCH, which is a logical channel, a PCH, which is a transmission channel, or a PDSCH, which is a physical channel. The UE may receive a paging message on the (N)PDSCH corresponding to an (N)PDCCH detected by monitoring/detecting (N)PDCCH masked with P-RNTI. Accordingly, in step S810, the UE may detect an (N)PDCCH masked with the P-RNTI, receive downlink control information (DCI) on the detected (N)PDCCH, and receive the (N)PRACH resource information and the (N)PUSCH grant information along with or through the paging message on the (N)PDSCH, based on the received DCI.

In step S820, the UE may transmit Msg1 to the base station. Specifically, based on the (N)PRACH resource information and the (N)PUSCH grant information received in the previous step, the UE may transmit early UL data along with an random access preamble. The random access preamble may be transmitted using the (N)PRACH resource indicated by the (N)PRACH resource information received in the previous step, and the early UL data may be transmitted on the (N)PUSCH indicated by the (N)PUSCH grant information received in the previous step.

In the present disclosure, the early UL data may refer to data of a higher layer. For example, the higher layer may be an RLC layer, a PDCP layer, or a higher layer (e.g., an application layer), and the early UL data may refer to user data for a higher layer. The early UL data may be delivered to the higher layer on a dedicated traffic channel (DTCH), which is a traffic channel.

In step S830, the base station may transmit Msg2 to the UE. Specifically, the base station may transmit HARK-ACK information about the early UL data received in the previous step to the UE along with a random access response to the random access preamble received in the previous step. As described above, the random access response may include a timing advance (TA) command and UL grant information for the L2/L3 message (or Msg3).

As an example, in step S830, the random access response may be transmitted/received on the (N)PDSCH, and HARQ-ACK information for the early UL data may be transmitted/received on the PHICH. In this case, the UE may detect a PHICH and (N)PDCCH masked with RA-RNTI in the same transmission time interval (e.g., subframe), and may receive the (N)PDSCH carrying the random access response using the DCI received on the (N)PDCCH. As another example, in step S830, the random access response and the HARQ-ACK information about the early UL data may be transmitted/received on the same (N)PDSCH. In this case, the UE may detect the (N)PDCCH masked with the RA-RNTI, an receive the random access response and the HARQ-ACK information about the early UL data on the (N)PDSCH scheduled by the DCI received on the (N)PDCCH.

The HARQ operation for the early UL data may be configured to be performed by the UE only at the request of the base station. In the case where the HARQ operation for the early UL data is configured, when the UE normally receives an ACK in Msg2 (e.g., S830), the UE may return to the power efficient state (e.g., RRC-IDLE or RRC-SUSPENDED) to reduce power consumption. On the other hand, if the UE does not receive the ACK in Msg2 (e.g., step S830) when the HARQ operation for the early UL data is configured, the UE may return to the power efficient state (e.g., RRC-IDLE or RRC-SUSPENDED) after performing the HARQ operation a predetermined number of times or for a predetermined time.

In order to enable the HARQ-ACK operation to be performed for the early UL data even when the base station does not have UE identification information (or UE ID) such as SAE Temporary Mobile Subscriber Identity (S-TMSI) or IMSI of the UE that the base station intends to page in the paging step (e.g., step S810), the UE may additionally transmit the information indicating the UE identification (or UE ID) thereof (e.g., S-TMSI or IMSI) in the Msg1 step (e.g., step S820). When the base station normally receives the early UL data, the base station may replace the HARQ-ACK operation by additionally transmitting UE identification information (or UE ID) (e.g., S-TMSI or IMSI) to the UE in the Msg2 step (e.g., S830). When the UE normally receives the UE identification information (or UE ID) in the Msg2 step (e.g., step S830), the UE may recognize that the early UL data has been normally transmitted to the base station and perform a subsequent operation. In this case, in step S830, the base station may not transmit HARQ-ACK information about the early UL data, and may transmit the UE identification information received in step S820 to the UE in place of HARQ-ACK information. When the UE receives the UE identification information about another UE in step S830, the UE may perform a subsequent operation, recognizing that the early UL data has not been normally transmitted to the base station.

Figure 9:
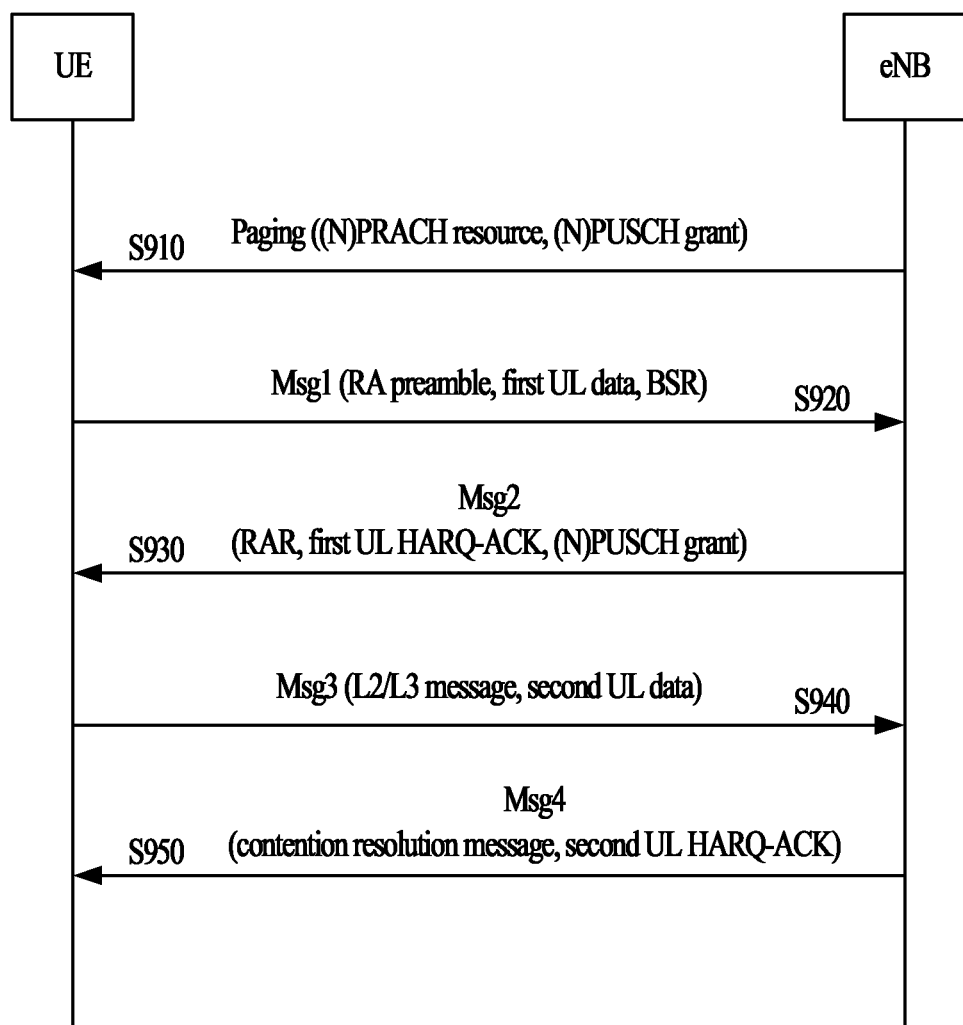

FIG. 9 illustrates a random access procedure (referred to as a second example for simplicity) in which the base station/UE transmits/receives (N)PRACH resource information and (N)PUSCH grant information in a paging step.

When UL data cannot be sufficiently transmitted in Msg1, or when early UL transmission is performed on some small data packets and the remaining data is transmitted in a subsequent step or after RRC connection, additional UL data indication information of the UE may be transmitted in Msg1 to inform the base station that there is additional data to be transmitted.

As the additional UL data indication information, the UE may use Buffer Status Report (BSR) information. Additionally or alternatively, in order for the UE to indicate presence of additional data to the base station through Msg1, the information may be distinguished by a time/frequency resource of the (N)PRACH. For example, the start point or region in the time domain for transmitting the (N)PRACH may be distinguished (by OFDM symbols or subframe units), or the start point or region may be distinguished in the frequency domain may be distinguished (by RB s or subcarrier units). Additionally or alternatively, it may be distinguished by a frequency hopping pattern. Additionally or alternatively, in the case of NB-IoT, a specific non-anchor Physical Resource Block (PRB) may be allocated to the (N)PRACH transmission region indicating early data transmission so as to be distinguished. Additionally or alternatively, it may be distinguished by multiplying each preamble symbol or preamble symbol group by an orthogonal cover code. For example, an existing preamble symbol or preamble symbol group may be multiplied by a signal such as "101010 . . . " on a symbol or symbol group basis to perform early data transmission. Additionally or alternatively, the preamble sequence may be partitioned.

While FIG. 9 illustrates a random access procedure in which the UE indicates additional UL data using a BSR in the Msg1 step, a random access procedure identical or similar to that of FIG. 9 may be performed even when the UE indicates additional UL data to the base station by a method corresponding to the above-mentioned BSR.

In step S910, the base station may transmit an (N)PRACH resource and an (N)PUSCH grant to the UE in the paging step. The operations or principles described in relation to step S810 may be applied to step S910 in the same/similar manner.

In step S920, the UE may transmit Msg1 to the base station. If the UE cannot fully transmit the early UL data using the scheduling information (e.g., (N)PUSCH grant information) received in the previous step, the UE may transmit some data (referred to as first UL data for simplicity) of the early UL data in step S920, and additionally transmit the remaining data (referred to as second UL data for simplicity) in the Msg3 step. In this case, the UE may transmit the BSR along with the first UL data. The BSR may represent a MAC message indicating information about the amount of data present in the buffer of the UE. The BSR may include information indicating a buffer size of the UE. Like the early UL data, the first UL data and the second UL data may correspond to data of a higher layer.

In step S920, the UE transmits the first UL data and BSR instead of the early UL data, which is the difference from step S820. Except for this point, the operations or principles described in relation to step S820 may be applied to step S920 in the same/similar manner. As described above, the first UL data corresponds to data of a layer higher than the MAC layer, but the BSR corresponds to a MAC message.

In step S930, the base station may transmit Msg2 to the UE. If the UE simultaneously transmits an RA preamble, UL data (or the first UL data), and BSR information in the Msg1 step (e.g., step S920), the base station may determine whether the grant information for additional UL data (or the second UL data) is needed through the BSR information. When the base station determines that grant information for additional UL data (or the second UL data) is needed based on the BSR information, the base station may transmit (N)PUSCH grant information for the additional UL data (or the second UL data) to the UE in step S930.

In this case, in step S930, the base station additionally transmits (N)PUSCH grant information for the second UL data and transmits HARQ-ACK information about the first UL data instead of HARQ-ACK information about the early UL data, which is the difference from step S830. Except for this point, the operations or principles described in relation to step S830 may be applied to step S930 in the same/similar manner. In step S930, the (N)PUSCH grant information for the second UL data may be transmitted on the same (N)PDSCH as the random access response. The (N)PUSCH grant information for the second UL data may be transmitted/received along with the UL grant information for the existing L2/L3 message through the random access response, or may be transmitted/received through a MAC message separate from the random access response.

If the eNB determines that grant information for additional UL data (or the second UL data) is not necessary, step S930 may be performed in the same manner as step S830.

Further, in step S930, grant information about Msg3 or the additional UL data transmitted by the base station may be differently interpreted according to reference signal received power (RSRP) measured by the UE or a coverage level (or coverage enhancement level) based thereon. For example, when the RSRP measured by the UE is low, the coverage level is determined to be high, and thus a large number of repetitive transmissions are required, the UE may interpret that allocation of a relatively large number of resources and a low Modulation Coding Scheme (MCS) are applied. As another example, when the RSRP measured by the UE is high, the coverage level is determined to be low, and thus a small number of repetitive transmissions are required, the UE may interpret this as meaning that allocation of a relatively small number of resources and a high MCS are applied.

In step S940, the UE may transmit Msg3 to the base station. In the case where the UE transmits a BSR indicating a buffer size larger than 0 in the Msg1 step (e.g., step S920) and transmits (N)PUSCH grant information for additional UL data (or the second UL data) in the Msg2 step (e.g., step S930), the UE may transmit an L2/L3 message based on the UL grant information received through the random access response, and transmit additional UL data (or the second UL data) based on (N)PUSCH grant information for the additional UL data (or the second UL data). In this case, the L2/L3 message and the additional UL data (or the second UL data) may be transmitted to the base station on a separate (N)PUSCH.

In step S940, the UE may differently interpret the grant information about Msg3 or the additional UL data transmitted by the base station depending on the measured RSRP or a coverage level (or coverage enhancement level) based thereon, and transmit Msg3 or additional UL data (see step S930).

In step S950, the base station may transmit Msg4 to the UE. Specifically, the base station may transmit HARQ-ACK information about the additional UL data (or the second UL data) received in the Msg3 step (e.g., S940) to the UE along with a contention resolution message. As described above, the contention resolution message may include an RRC connection setup message and UE identification information (or UE ID).

As an example, in step S950, the contention resolution message may be transmitted/received on (N)PDSCH, and HARQ-ACK information about the additional UL data (or the second UL data) may be transmitted/received on PHICH. In this case, the UE may detect the PHICH and an (N)PDCCH masked with a temporary C-RNTI (TC-RNTI) in the same transmission time interval (TTI) (e.g., subframe or slot), and may receive (N)PDSCH that carries the contention resolution message, using the DCI received through the PDCCH. As another example, in step S950, the contention resolution message and the HARQ-ACK information about the additional UL data (or the second UL data) may be transmitted/received on the same (N)PDSCH. In this case, the UE may detect an (N)PDCCH masked with TC-RNTI and receive an (N)PDSCH that carries a random access response using the DCI received on the (N)PDCCH. The TC-RNTI may be received through Msg2 in step S930.

The base station may also configure whether to perform the UL HARQ-ACK operation for the additional UL data for the UE. In the case where the base station establishes a configuration for the UE such that the UE performs the UL HARQ-ACK operation for the additional UL data, the UE may return to the power efficient state (e.g., RRC-IDLE or RRC-SUSPENDED) upon receiving an ACK for the additional UL data in Msg4 (e.g., step S950). In the case where the base station establishes a configuration for the UE such that the UE does not perform the UL HARQ-ACK operation for the additional UL data, the UE may perform the HARQ operation a predetermined number of time or for a predetermined time.

In step S810 or step S910, when the network or the base station designates an (N)PRACH resource and an (N)PUSCH grant for an idle UE along with a paging message, various methods may be used to signal to the UE that (N)PUSCH grant information for early UL data is transmitted. For example, to signal to the UE, a specific RNTI may be used, a reserved bit of the DCI in the (N)PDCCH may be used, or a flag indicating a corresponding early UL data transmission may be added to the paging message and delivered to the UE. Alternatively, an (N)PRACH resource or an RA preamble may be designated.

In the case where whether the (N)PUSCH grant information is transmitted is indicated to the UE using a specific RNTI, an RNTI value not designated for a specific use may be used. For example, the RNTI may be expressed as four hexa-decimal values. In the current standard, the values from FFF4 to FFF9 are reserved rather being allocated for a specific use. Therefore, one of FFF4 to FFF9 may be assigned to the specific RNTI. For simplicity, this method of allocating/using a specific RNTI is referred to as Opt1 in the present disclosure.

When Opt1 is used, the UE may monitor (N)PDCCH using the specific RNTI indicating whether (N)PUSCH grant information is transmitted, and may recognize that (N)PUSCH grant information is additionally transmitted when the UE detects an (N)PDCCH masked with the specific RNTI.

In the case where a reserved bit in the DCI of the (N)PDCCH is used, (N)PUSCH grant information transmission may be indicated to the UE by pre-designating a specific bit among the reserved bits and setting the designated reserved bit to a specific value. For example, when DCI format 1A is used to schedule a paging message, the (N)PUSCH grant information transmission may be indicated to the UE by setting a specific bit (e.g., MSB) of the TPC field of DCI format 1A to a specific value (e.g., 1). As another example, when DCI format N2 is used to schedule a paging message, (N)PUSCH grant information transmission may be indicated to the UE by setting a specific one (e.g., the first bit or the last bit of the reserved bits) of the reserves bits of DCI format N2 to a specific value (e.g., 0). For simplicity, the method of using a reserved bit in the DCI is referred to as Opt2 in the present disclosure.

When Opt2 is used, the UE may monitor/detect an (N)PDCCH masked with the P-RNTI, and may receive/identify (N)PUSCH grant information when a specific reserved bit of the DCI received on the detected (N)PDCCH is set to a specific value.

In the case where a flag is used in the paging message, the paging message may include paging record-related information, UE identification information, information indicating whether the system information is changed, and Earthquake & Tsunami Warning System (ETWS) indication information, and may further include flag information indicating whether (N)PUSCH grant information is additionally transmitted along with the paging message. For simplicity, this method of adding flag information to the paging message and using the same is referred to as Opt3 in the present disclosure.

When Opt3 is used, the UE may detect an (N)PDCCH masked with P-RNTI, receive a paging message on an (N)PDSCH based on the (N)PDCCH, and then receive/identify (N)PUSCH grant information according to the flag information in the paging message.

Figure 10:
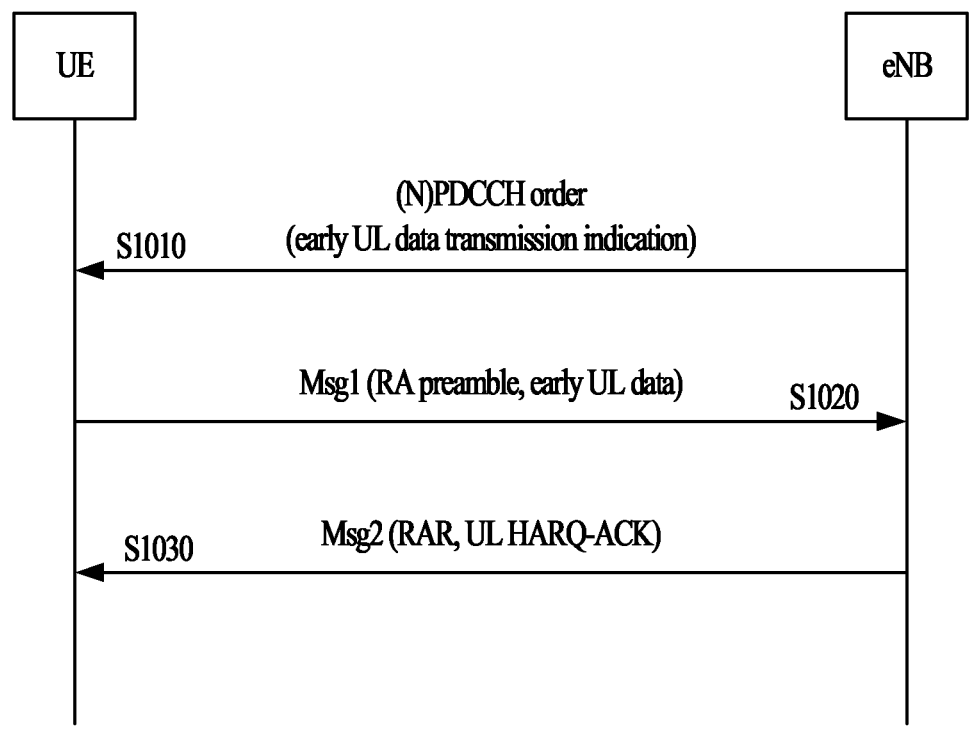
Figure 11:
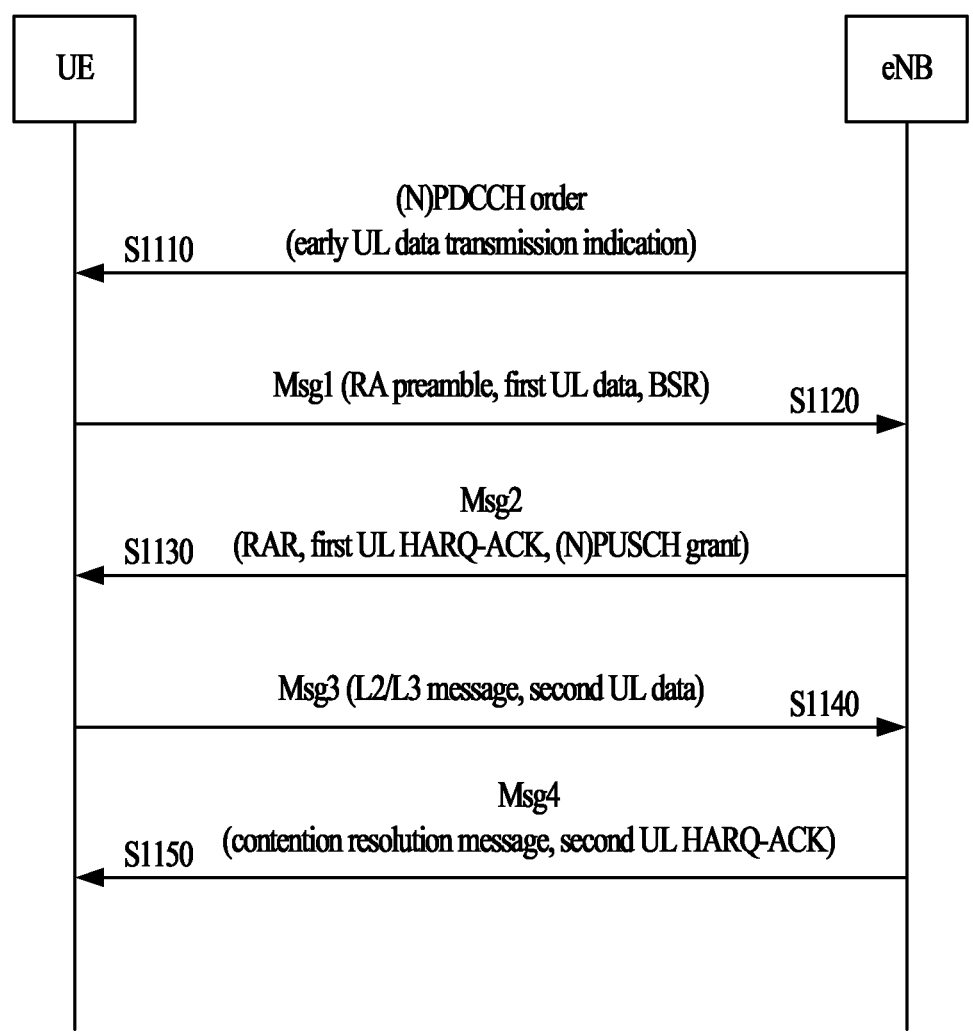

FIGS. 10 and 11 illustrate a random access procedure in which a base station indicates early UL data transmission through an (N)PDCCH order. For simplicity, the procedure of FIG. 10 is referred to as a third example and the procedure of FIG. 11 is referred to as a fourth example. In the random access procedure of FIG. 10, data (e.g., small data) is subjected to early UL transmission and no additional UL data transmission is needed. In the random access procedure of FIG. 11, a portion of the data (e.g., large data) is subjected to early UL transmission and the rest of the data is transmitted as additional UL data.

In the third and fourth examples of the random access procedure according to the present invention, the network may instruct the UE, through the (N)PDCCH order, to perform early UL data transmission during the random access procedure. Specifically, the network or base station may indicate early UL data transmission in the Msg1 step to the UE through the (N)PDCCH order, and the UE may transmit early UL data to the base station in the Msg1 step based on the indication through the (N)PDCCH order.

Various methods may be used to indicate early UL data transmission. For example, a reserved bit of the DCI transmitted through the (N)PDCCH order may be used, or a specific RNTI may be used to indicate early UL data transmission. Alternatively, the early UL data transmission may be indicated by designating an (N)PRACH resource or an RA preamble.

In the case where a reserved bit of the DCI transmitted through the (N)PDCCH order is used, one of the reserved bits may be pre-designated and the designated reserved bit may be set to a specific value to indicate early UL data transmission to the UE. For example, when DCI format 1A is used for the PDCCH order, a specific one of the reserved bits of DCI format 1A (e.g., the first or last one of the reserved bits, the HARQ processor number field, or the Downlink Assignment Index (DAI) field) may be set to a specific value (e.g., 1) to indicate early UL data transmission to the UE. As another example, when DCI format N1 is used for the NPDCCH order, a specific one of the reserved bits of DCI format N1 (e.g., the first or last one of the reserved bits, or a New Data Indicator (NDI) bit, or an ACK/NACK Resource Indictor (ARI) field) may be set to a specific value (e.g., 0) to indicate early UL data transmission to the UE. For simplicity, this method of using the reserved bits in the DCI is referred to as Opt4 in the present disclosure.

When Opt4 is used, the UE may monitor/detect the (N)PDCCH using the C-RNTI, and may perform early UL data transmission in the Msg2 step (e.g., step S1010 of FIG. 10 or step S1110 of FIG. 11) when the specific reserved bit of the DCI received on the (N)PDCCH is set to a specific value.

When a specific RNTI is used, Opt1 may be applied. Accordingly, the UE may monitor the (N)PDCCH using the specific RNTI and may perform the early UL data transmission in the Msg2 step (e.g., step S1010 of FIG. 10 or step S1110 of FIG. 11) when it detects an (N)PDCCH masked with the specific RNTI.

Referring to FIG. 10, in step S1010, the base station may indicate a random access procedure to the UE through an (N)PDCCH order. In addition, the base station may indicate early UL data transmission to the UE through the (N)PDCCH order. As described above, in order to indicate early UL data transmission through the (N)PDCCH order, the base station may use a reserved bit of the DCI transmitted through the (N)PDCCH order (e.g., Opt4) or use a specific RNTI (e.g., Opt1). Alternatively, a designated (N)PRACH resource or RA preamble may be used.

In the case where the base station indicates early UL data transmission using a reserved bit of the DCI transmitted through the (N)PDCCH order, the UE may monitor/detect a PDCCH masked with C-RNTI, receive DCI (e.g., DCI format 1A or DCI format N1) on the detected PDCCH, and then check whether a specific reserved bit of the DCI is set to a specific value (e.g., 1 for DCI format 1A or 0 for DCI format N1). When the specific reserved bit is set to the specific value, the UE may interpret that the base station indicate early UL data transmission. In this case, the (N)PRACH information for random access preamble transmission and the (N)PUSCH grant information for early UL data transmission may be received through the DCI transmitted through the (N)PDCCH order.

In the case where the base station indicates early UL data transmission using a specific RNTI, the specific RNTI (corresponding to, for example, the values of FFF4 to FFF9) may be pre-specified between the base station and the UE, and the UE may monitor an (N)PDCCH masked with the specific RNTI. When the UE detects the (N)PDCCH masked with the specific RNTI, the UE may interpret that the base station indicate early UL data transmission. In this case, the (N)PRACH information for random access preamble transmission and the (N)PUSCH grant information for early UL data transmission may be received through the DCI transmitted on the (N)PDCCH masked with the specific RNTI.

In step S1020, the UE may transmit Msg1. The operations or principles described in relation to step S820 may be applied to step S1020 in the same/similar manner.

In step S1030, the base station may transmit Msg2. The operations or principles described in relation to step S830 may be applied to step S1030 in the same/similar manner.

Referring to FIG. 11, in step S1110, the base station may transmit an (N)PDCCH order to the UE. The operations or principles described in relation to step S1010 may be applied to step S1110 in the same/similar manner.

The operations or principles described in relation to steps S920 to S950 may be applied to steps S1120 to S1150 in the same/similar manner, respectively. In this case, in the description relating to steps S920 to S950, steps S920 to S950 may be replaced with steps S1120 to S1150, respectively.

For example, the method of the UE indicating additional UL data to the base station in Msg1 described with reference to FIG. 9, the method of transmitting Msg3 or grant information for the additional UL data by differently interpreting the Msg3 or grant information for the additional UL data transmitted by the base station according to the RSRP measured by the UE or a coverage level based thereon, and the like may be applied to the method illustrated in FIG. 11 in the same or similar manner.

Method 1-2: Transmitting Early UL Data in Msg3

One of the main purposes of performing the random access procedure is UL synchronization. Conventionally, the base station may indicate UL synchronization to a specific UE that has lost UL synchronization by initiating a random access procedure through the (N)PDCCH order. In the present invention, when the base station may initiate a random access procedure through the (N)PDCCH order, it may instruct the UE to perform early UL data transmission during the random access procedure. In the case where the network indicates early UL data transmission to a specific UE that is not UL synchronized through an (N)PDCCH order, the UE may perform the random access procedure as described below.

Figure 12:
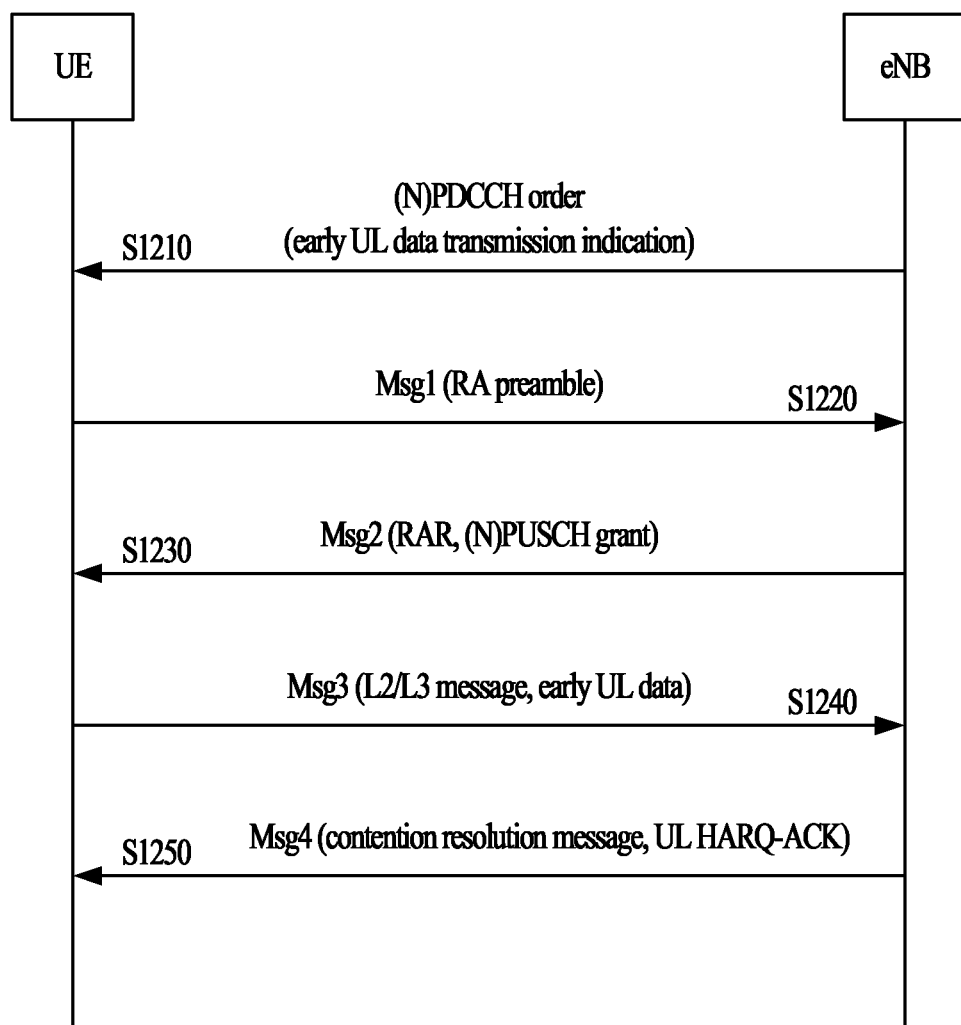

FIG. 12 illustrates a random access procedure (referred to as a fifth example for simplicity) performed by a base station/UE when early UL data transmission is indicated through an (N)PDCCH order.

In step S1210, the base station may indicate initiation of a random access procedure to the UE through the (N)PDCCH order. That is, the (N)PDCCH order may be monitored/detected using the C-RNTI of the UE, and the DCI transmitted through the (N)PDCCH order may indicate (N)PRACH resource information.

In addition, in step S1210, the base station may indicate early UL data transmission through Msg3 to the UE through the (N)PDCCH order. The methods described with reference to FIGS. 10 and 11 may be used to indicate early UL data transmission to the UE through Msg3. For example, in order for the network or base station to instruct the UE, through the (N)PDCCH order, to perform early UL data transmission in Msg3 during the random access procedure, a reserved bit of the DCI transmitted through the (N)PDCCH order may be used (e.g., Opt4) or a specific RNTI may be used (e.g., Opt1). Alternatively, an (N)PRACH resource or an RA preamble may be designated.

Alternatively, in step S1210, the base station may not indicate early UL data transmission through Msg3 to the UE through the (N)PDCCH order, but may indicate early UL data transmission through Msg3 on the (N)PDCCH corresponding to (N)PDSCH carrying a random access response in step S1230. If the base station does not indicate early UL data transmission through Msg3 in step S1210, the (N)PDCCH order may be transmitted/received in the same manner as in the conventional method. For example, the reserved bits are not used, monitoring/detection is performed using the C-RNTI, and the specific RNTI is not used.

Alternatively, in step 1210, the base station may indicate early UL data transmission through Msg3 to the UE through the (N)PDCCH order, and may additionally indicate early UL data transmission through Msg3 to the UE on the (N)PDCCH in step S1230.

In step S1220, the UE may transmit Msg1 to the base station. Specifically, the UE may transmit a random access preamble to the base station based on the (N)PRACH resource information received in step S1210. Step S1220 may be performed in the same manner as in the conventional method.

In step S1230, the base station may transmit Msg2 to the UE. When the base station indicates early UL data transmission through Msg3, the base station may additionally transmit (N)PUSCH grant information for early UL data along with a random access response to the random access preamble received in step S1220. As described above, the random access response may include a timing advance (TA) command and UL grant information for an L2/L3 message (or Msg3).

The (N)PUSCH grant information for early UL data may be transmitted/received through a random access response along with UL grant information for the existing L2/L3 message (or Msg3), or may be transmitted/received through a MAC message separate from the random access response.

As described above, in step S1230 separately from step S1210 or as well as step S1210, the base station may indicates early UL data transmission through Msg3. For example, the base station may use a specific RNTI for (N)PDCCH for scheduling Msg2 transmission (e.g., Opt1), or use a reserved bit of the (N)PDCCH DCI (e.g., Opt4) to indicate early UL transmission through Msg3 to the UE.

In step S1240, the UE may transmit Msg3 to the base station. In the case where the base station indicates early UL data transmission in the Msg1 step (e.g., step S1210) and/or the Msg2 step (e.g., step S1230), and the UE receives (N)PUSCH grant information in the Msg2 step (e.g., step S1230), the UE may transmit an L2/L3 message based on the UL grant information received through the random access response and transmit early UL data based on the (N)PUSCH grant information in step S1240. In this case, the L2/L3 message and the early UL data may be transmitted to the base station on a separate (N)PUSCH.

In step S1240, Msg3 or early UL data may be transmitted by differently interpreting the grant information about Msg3 or early UL data transmitted by the base station according to the RSRP measured by the UE or a coverage level (or coverage enhancement level) based thereon (see step S930).

In step S1250, the base station may transmit Msg4 to the UE. Specifically, the base station may transmit, to the UE, HARQ-ACK information about the early UL data received in the Msg3 step (e.g., S1240) along with a contention resolution message. Step S1250 is different from step S950 in that the HARQ-ACK information about the early UL data is transmitted instead of HARQ-ACK information about the additional UL data (the second UL data). Except for this point, the operations or principles described in relation to step S950 may be applied to the step S1250 in the same/similar manner.

Figure 13:
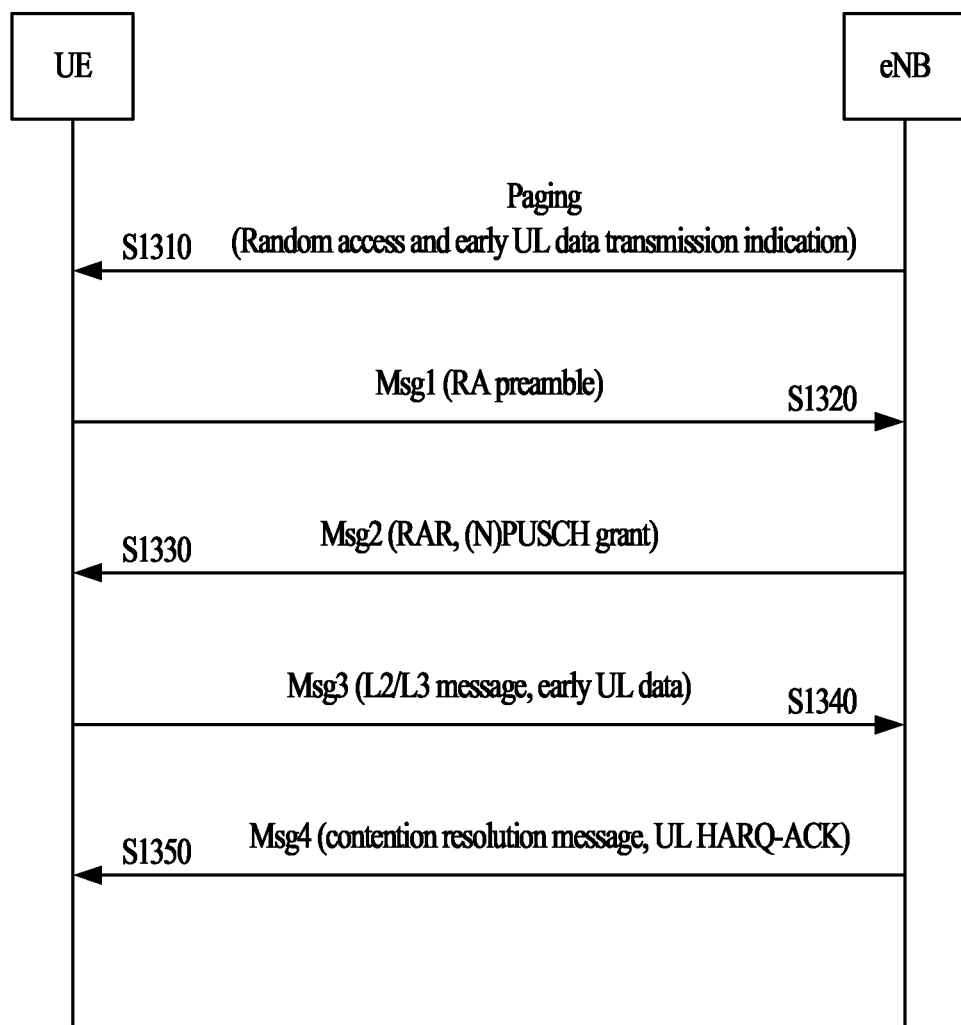

FIG. 13 illustrates a random access procedure (referred to as a sixth example for simplicity) performed by a base station/UE when early UL data transmission is indicted through paging.

The network or base station may instruct an idle UE (e.g., a UE in the RRC-IDLE or RRC-SUSPENDED state) to perform early UL data transmission in the Msg3 step, while paging the UE. In order to indicate the early UL data transmission through Msg3, the base station may use the methods described in relation to steps S810 and S910 in the paging step (e.g., step S1310) in the same/similar manner. For example, to indicate early UL data transmission through Msg3 to the UE in the paging step, a specific RNTI may be used (e.g., Opt1), a reserved bit of DCI using P-RNTI may be used (e.g., Opt2), a flag indicating early UL data transmission may be added to a paging message (e.g., Opt3), or a specific (N)PRACH resource or RA preamble may be designated.

The random access procedure of FIG. 13 is for early UL data transmission through Msg3, while the random access procedure of FIG. 8 or 9 is for early UL data transmission through Msg1 or Msg1/Msg3.

In step S1310, the base station may indicates a random access procedure and UL data transmission through Msg3 to the UE through paging. More specifically, the base station may transmit (N)PRACH resource information to the UE along with a paging message on a paging occasion configured for the UE. As described above, the paging message may be transmitted to the UE on a PCCH, which is a logical channel, a PCH, which is transmission channel, or a PDSCH, which is physical channel, and the UE may acquire scheduling information for a PDSCH carrying the paging message by monitoring a PDCCH masked with a Paging Radio Network Temporary Identifier (P-RNTI), and receive the paging message on the PDSCH based on the acquired scheduling information.

In step S1320, the UE may transmit Msg1 to the base station. Specifically, the UE may transmit a random access preamble to the base station based on the (N)PRACH resource information received in step S1310. Step S1320 may be performed in the same manner as the conventional method.

Steps S1330, S1340, and S1350 may be performed in the same/similar manner as/to steps S1230, S1240, and S1250, respectively. For simplicity, the detailed description is incorporated by reference.

Method 2: The Base Station Transmits Early DL Data During the Random Access Procedure Method 2-1: Transmitting Early DL Data in Msg2

It is proposed that the base station transmit early DL data to the UE in the Msg2 step. Specifically, the network or the base station may inform the UE through an (N)PDCCH order that the early DL transmission is to be performed in the Msg2 step during the random access procedure. When the early DL transmission is indicated to the UE through the (N)PDCCH order, the UE may receive early DL data from the base station in the Msg2 step.

Figure 14:
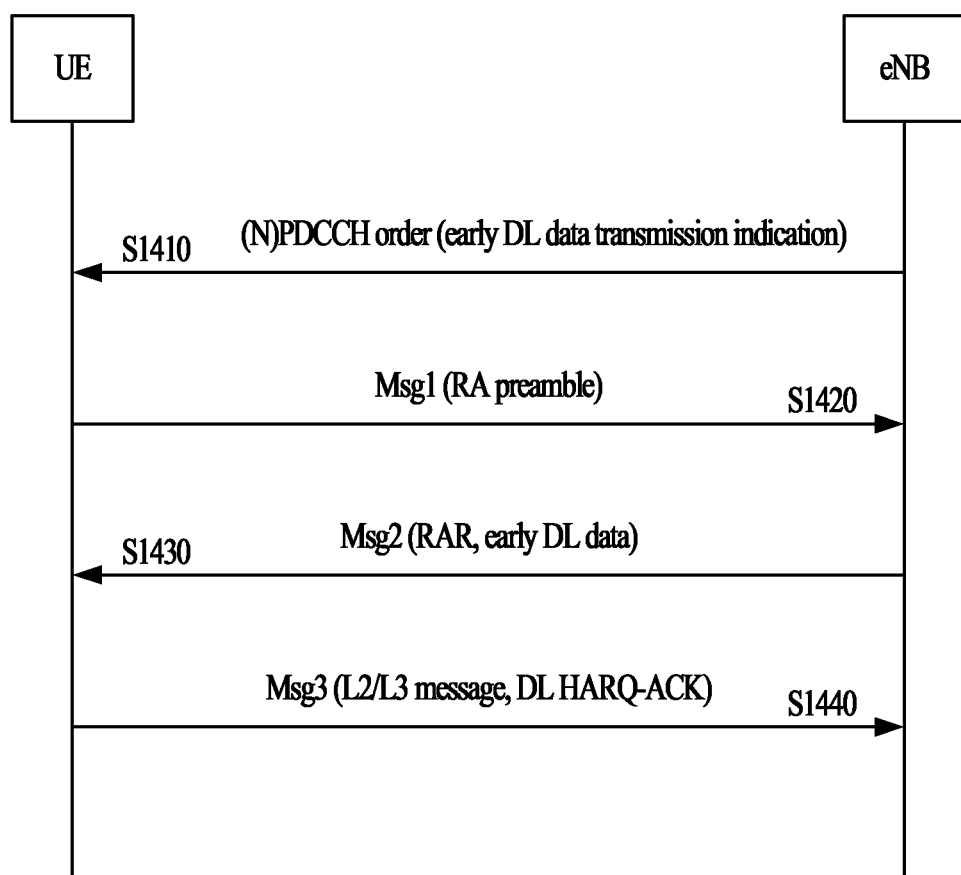

FIG. 14 illustrates an operation of a base station/UE for transmitting/receiving early DL data in the Msg2 step of a random access procedure.

In step S1410, the base station may transmit, to the UE, an (N)PDCCH order indicating initiation of the random access procedure. In addition, the (N)PDCCH order may indicate early DL data transmission in Msg2 to the UE. Various methods may be used to indicate the early DL data transmission in Msg2. For example, the early DL data transmission may be indicated using a reserved bit of the DCI transmitted through the (N)PDCCH order (e.g., Opt4) or using a specific RNTI (e.g., Opt1). Alternatively, it may be indicated by designating an (N)PRACH resource or RA preamble.

In the case where a reserved bit of the DCI transmitted through the (N)PDCCH order is used, one of the reserved bits may be pre-designated, and the designated reserved bit may be set to a specific value to indicate the early DL data transmission to the UE. For example, when DCI format 1A is used for a PDCCH order, a specific one of the reserved bits of DCI format 1A may be set to a specific value (e.g., 1) to indicate the early DL data transmission to the UE. As another example, when DCI format N1 is used for an NPDCCH order, a specific one of the reserved bits of DCI format N1 may be set to a specific value (e.g., 0) to indicate the early DL data transmission to the UE. When the UE detects an (N)PDCCH order masked with the C-RNTI, the UE may check whether a specific reserved bit of the DCI received through the (N)PDCCH is set to a specific value. If the specific reserved bit is set to the specific value, the UE may perform early DL data reception in the Msg2 step. If the specific reserved bit is not set to the specific value, the early DL data transmission in the Msg2 step may be skipped.

In the case where early DL data transmission is indicated to the UE using a specific RNTI, an RNTI value not designated for a specific use may be used. For example, as described above, one of FFF4 to FFF9 among hexadecimal values not allocated in the current standard may be allocated to a specific RNTI indicating early DL data reception. In this case, the UE may monitor (N)PDCCH using the pre-allocated specific RNTI. Upon detecting an (N)PDCCH masked with the specific RNTI, the UE may interpret the detected (N)PDCCH as an (N)PDCCH order. In this case, the detected (N)PDCCH order may indicate initiation of a random access procedure and DL data transmission in Msg2. The UE may initiate the random access procedure based on the (N)PDCCH order and may operate to receive early DL data in the Msg2 step. When an (N)PDCCH order masked with C-RNTI is detected, the detected (N)PDCCH order may indicate initiation of the random access procedure and indicate that early DL data transmission will not be performed in the Msg2 step. In this case, the early DL data transmission in Msg2 may be skipped.

Alternatively, in step S1410, the early DL data transmission may not be indicated to the UE through the (N)PDCCH order in step S1410. Instead, the early DL data transmission may be indicated to the UE in step S1430, using a specific RNTI (e.g., Opt1) in Msg2 transmission (e.g., Opt1) or using a reserved bit of the (N)PDCCH DCI for Msg2 (e.g., Opt4).

Alternatively, the early DL data transmission may be indicated to the UE through the (N)PDCCH order in step S1410. Additionally, the early DL data transmission may be indicated to the UE in step S1430, using a specific RNTI (e.g., Opt1) or using a reserved bit of the (N)PDCCH DCI for in Msg2 (e.g., Opt4).

In step S1420, the UE may transmit Msg1 to the base station. Specifically, the UE may transmit a random access preamble to the base station based on the (N)PRACH resource information received in step S1410. Step S1420 may be performed in the same manner as the conventional random access procedure (e.g., see step S710 of FIG. 7).

In step S1430, the base station may transmit Msg2 to the UE. In the case where the base station indicates early DL data transmission to the UE in step S1410 and/or step S1430, the base station may additionally transmit early DL data along with a random access response to the random access preamble received in the Msg1 step (e.g., step S1420). As described above, the random access response may include a timing advance (TA) command and UL grant information for an L2/L3 message (or Msg3). The early DL data may be transmitted/received through the random access response or separately from the random access response.

When the (N)PDCCH order received in step S1410 and/or the (N)PDCCH received in step S1430 indicate DL data transmission in Msg2, the UE may receive early DL data through a random access response or separately from the random access response. Specifically, in step S1430, the UE may monitor/detect an (N)PDCCH masked with the RA-RNTI, and receive a random access response including the early DL data on an (N)PDSCH corresponding to the detected (N)PDCCH or receive the random access response and the early DL data on the (N)PDSCH.

The early DL data may refer to data of a higher layer. For example, the higher layer may be the RLC layer, the PDCP layer, or a higher layer (e.g., an application layer). The early DL data may refer to user data for a higher layer. The early DL data may be delivered to a higher layer on a dedicated traffic channel (DTCH), which is a traffic channel.

In step S1440, the UE may transmit Msg3 to the base station. Specifically, in step S1440, the UE may transmit HARQ-ACK information about the early DL data along with an L2/L3 message for the random access procedure. For example, the L2/L3 message may be transmitted on an (N)PUSCH using the UL grant information included in the random access response, and the HARQ-ACK information about the early DL data may be transmitted on the same (N)PUSCH. Alternatively, in the case where simultaneous transmission of PUSCH/PUCCH is configured, the L2/L3 message may be transmitted on the PUSCH using the UL grant information included in the random access response, and the HARQ-ACK information about the early DL data may be transmitted on the PUCCH.

Method 2-2: The Base Station Transmits Early DL Data Simultaneously with Paging

The network or base station may perform early DL data transmission while paging an idle UE (e.g., a UE in the RRC-IDLE or RRC-SUSPENDED state). In order to inform the UE of early DL data transmission in the paging step, a specific RNTI may be used (e.g., Opt1), or a reserved bit of DCI using P-RNTI may be used (e.g., Opt2). Alternatively, a specific (N)PRACH resource or RA preamble may be designated to inform the UE that early DL data is being transmitted along with paging.

Figure 15:
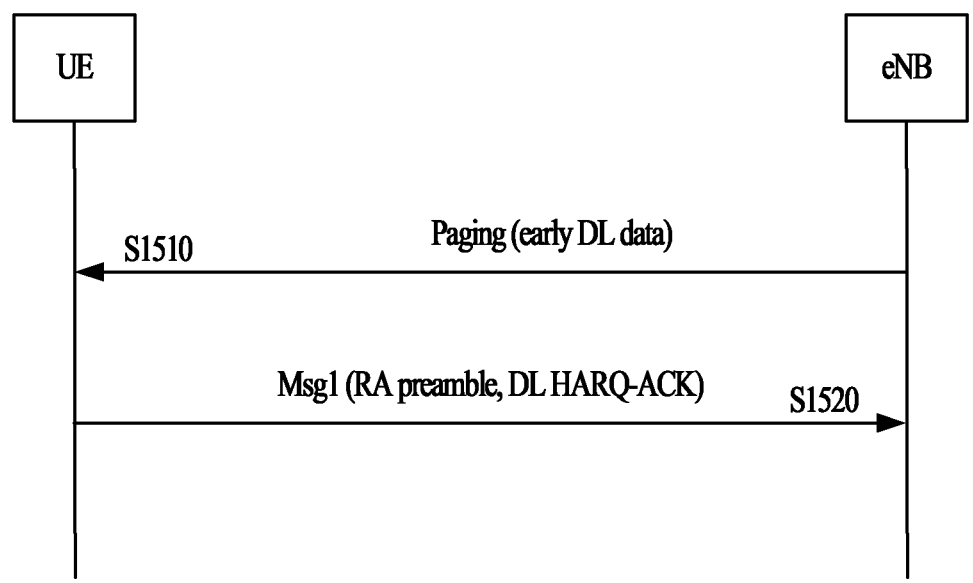

FIG. 15 illustrates a random access procedure performed by a base station/UE for early DL data transmission in a paging step.

In step S1510, the base station may transmit early DL data along with a paging message. More specifically, the base station may transmit the early DL data along with the paging message to the UE on the (N)PDSCH on a paging occasion configured for the UE. The paging message may include (N)PRACH resource information.

In step S1510, the UE may monitor/detect an (N)PDCCH using the P-RNTI. When a specific reserved bit of the DCI received on the detected (N)PDCCH is set to a specific value (see, for example, Opt2), the early DL data may be received along with the paging message on an (N)PDSCH corresponding to the (N)PDCCH. Alternatively, the UE may monitor/detect (N)PDCCH using the specific RNTI described above (see, for example, Opt1). When an (N)PDCCH masked with the specific RNTI is detected, the early DL data may be received along with the paging message on the (N)PDSCH corresponding to the (N)PDCCH.

In step S1520, the UE may transmit HARQ-ACK information about the early DL data along with a random access preamble.

Method 2-3: The Base Station Transmits Early DL Data Simultaneously with Paging and the UE Transmits Early UL Data Through Msg1

When early DL data transmission is indicated along with paging, early UL data transmission in the Msg1 step may be additionally indicated. In this case, the base station should transmit (N)PUSCH grant information for early UL data transmission in the Msg1 step as well as the paging message and the early DL data in the paging step. In order to distinguish the case of indicating both early DL data transmission and early UL data transmission along with paging from the case of indicating only early DL data transmission or early UL data transmission, an independent RNTI may be used (see, for example, Opt1), or a reserved bit in the (N)PDCCH DCI may be used (see, for example, Opt2), or a bit may be added to the paging message and used (see, for example, Opt3). Alternatively, a specific (N)PRACH resource or RA preamble may be designated and indicated to the UE.

When early UL data transmission is indicated to the UE in the Msg1 step, the UE may transmit DL HARQ-ACK information for the early DL data and early UL data on independent channels (e.g., PUCCH and PUSCH), respectively or on one (N)PUSCH in the Msg1 step. Either the base station or the UE may determine whether to perform the transmission on independent channels or one channel.

When the determination is performed by the base station, the following method may be used to indicate the determined method to the UE during paging. A specific RNTI may be used, a reserved bit of DCI using the P-RNTI may be used, some bits of the paging message may be used, or a specific (N)PRACH resource or RA preamble may be designated. The base station may deliver, to the UE, scheduling information according to the determined method.

Figure 16:
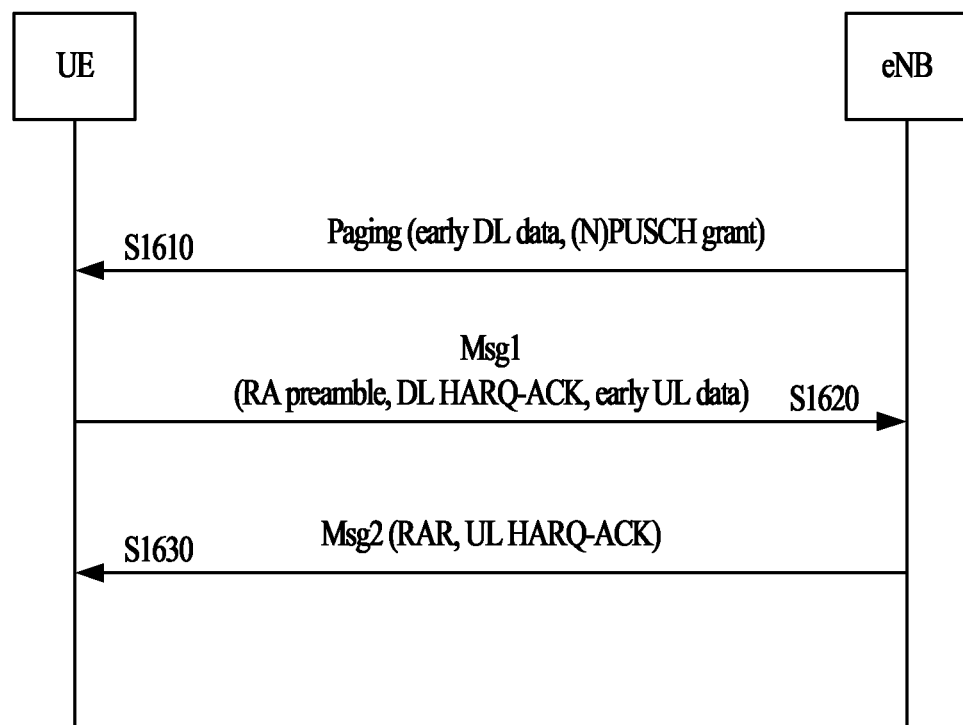

FIG. 16 illustrates a random access procedure performed by a base station/UE when early UL data transmission and early DL data transmission are indicated simultaneously in a paging step.

In step S1610, the base station may indicate early DL data transmission along with a paging message. In addition, the base station may transmit the early DL data along with the page message to the UE in step S1610. In addition, in step S1610, the base station may transmit (N)PUSCH grant information for early UL data transmission through Msg1 to the UE. The paging message, early DL data, and (N)PUSCH grant information may be transmitted on one (N)PDSCH. In addition, the (N)PRACH resource information may be received through the paging message.

In step S1610, the UE may monitor/detect (N)PDCCH using the P-RNTI. When a specific reserved bit of the DCI received through the detected (N)PDCCH is set to a specific value, the UE may receive early DL data and (N)PUSCH grant information along with the paging message on an (N)PDSCH corresponding to the (N)PDCCH. Alternatively, the UE may monitor/detect (N)PDCCH using the specific RNTI described above. When an (N)PDCCH masked with the specific RNTI is detected, the UE may receive early DL data and (N)PUSCH grant information along with the paging message on an (N)PDSCH corresponding to the (N)PDCCH.

In step S1620, the UE may transmit a random access preamble using the (N)PRACH resource information. In addition, using the (N)PUSCH grant information received in step S1610, the UE may transmit, on the (N)PUSCH, early UL data along with DL HARQ-ACK information about the early DL data received in step S1610. Alternatively, in the case where it is determined that the DL HARQ-ACK information and the early UL data will be transmitted on independent channels, the DL HARQ-ACK information and the early UL data may be transmitted simultaneously on the PUCCH and the PUSCH, respectively.

In step S1630, the base station may transmit Msg2. Specifically, the base station may transmit UL HARQ-ACK information about early UL data to the UE along with the random access response. The UL HARQ-ACK information and the random access response may be transmitted on the same (N)PDSCH.

The UE may monitor/detect (N)PDCCH using the RA-RNTI, and receive, on the (N)PDCCH, the random access response and UL HARQ-ACK information about the early UL data, based on the DCI received on the detected (N)PDCCH.

In the case where additional DL data transmission is needed in the Msg2 step, the UE may be informed in the paging step that there is additional DL information in Msg2. After receiving the additional data in the Msg2 step, the UE may transmit DL HARQ-ACK in the Msg3 step if necessary.

Similarly, in the case where additional UL data transmission is needed in the Msg3 step, the base station may be informed in the Msg1 step that there is additional UL data, receive additional (N)PUSCH grant information in the Msg2 step, and transmit the additional UL data in the Msg3 step. Then, in step Msg4, the base station receives UL HARQ-ACK. As a method of informing the base station that there is additional UL data in the Msg1 step, the method of indicating the additional UL data to the base station in the Msg1 step as described with reference to FIG. 9 may be used.

In performing early DL data transmission along with paging, the UL HARQ-ACK information of Msg1 may include UE identification information (or UE ID) for use in HARQ-ACK of a paged UE.

The methods described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the methods of the present invention may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present invention or included as a new claim by a subsequent amendment after the application is filed.

Figure 17:
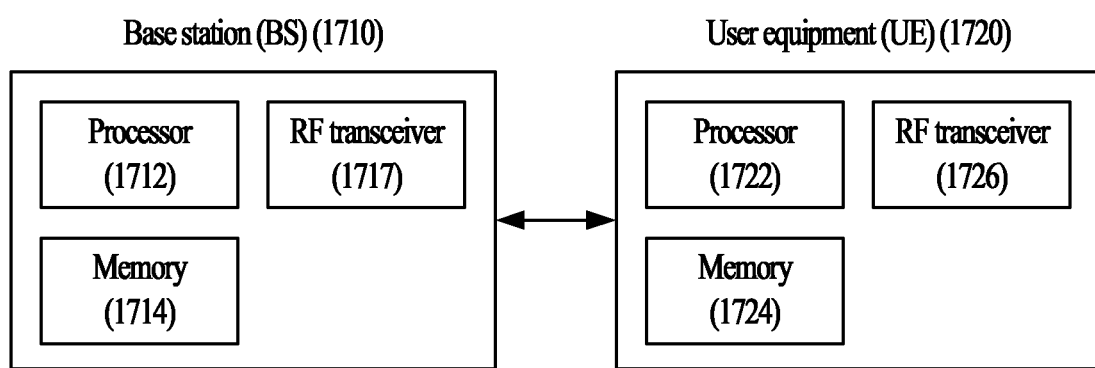
FIG. 17 illustrates a base station and a user equipment to which the present invention is applicable.

FIG. 17 illustrates a BS and a UE to which the present invention is applicable.

Referring to FIG. 17, a wireless communication system includes the BS 1710 and the UE 1720. When the wireless communication system includes a relay, the BS 1710 or the UE 1720 may be replaced with the relay.

The BS 1710 includes a processor 1712, a memory 1714, and a radio frequency (RF) transceiver 1716. The processor 1712 may be configured to embody the procedures and/or methods proposed by the present invention. The memory 1714 is connected to the processor 1712 and stores various pieces of information associated with an operation of the processor 1712. The RF transceiver 1716 is connected to the processor 1712 and transmits/receives a radio signal. The UE 1720 includes a process 1722, a memory 1724, and an RF transceiver 1726. The processor 1722 may be configured to embody the procedures and/or methods proposed by the present invention. The memory 1724 is connected to the processor 1722 and stores various pieces of information associated with an operation of the processor 1722. The RF transceiver 1726 is connected to the processor 1722 and transmits/receives a radio signal.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present invention may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

The present invention is applicable to a wireless communication apparatus such as a user equipment (UE), a base station (BS), etc.

What is claimed is:

1. A method of performing a random access procedure by a user equipment (UE) in a wireless communication system, the method comprising:
receiving information for configuring both a first resource for a random access preamble and a second resource for a physical uplink shared channel (PUSCH) together, the first resource and the second resource being separate resources;
performing a transmission of the random access preamble for the random access procedure in the first resource and a transmission of the PUSCH in the second resource; and
receiving, from a base station (BS), a message for the random access procedure, in response to the transmissions of the random access preamble and the PUSCH.

2. The method according to claim 1, wherein the transmissions of the random access preamble and the PUSCH are performed through a message for the random access procedure.

3. The method according to claim 1, the transmission of the PUSCH is performed prior to the message is received from the BS.

4. The method according to claim 1, wherein the random access procedure is performed in a radio resource control (RRC) idle state.

5. The method according to claim 1, wherein uplink data transmitted through the PUSCH includes an identifier (ID) of the UE.

6. The method according to claim 1, wherein message includes at least one of a timing advance (TA) command, or an uplink grant for a subsequent uplink transmission.

7. The method according to claim 1, wherein a specific radio network temporary identifier (RNTI) is used for the random access procedure supporting early PUSCH transmission in the random access procedure.

8. A non-transitory processor readable medium recorded thereon instructions for performing the method according to claim 1.

9. A device configured to perform a random access procedure in a wireless communication system, the device comprising:
a memory configured to store instructions; and
a processor configured to perform operations by executing the operations, the operations comprising:
receiving information for configuring both a first resource for a random access preamble and a second resource for a physical uplink shared channel (PUSCH) together, the first resource and the second resource being separate resources;
performing a transmission of the random access preamble for the random access procedure in the first resource and a transmission of the PUSCH in the second resource; and
receiving, from a base station (BS), a message for the random access procedure, in response to the transmissions of the random access preamble and the PUSCH.

10. The device of claim 9, further comprising:
a transceiver,
wherein the device is a user equipment (UE) configured to operate in a wireless communication system.

11. The device of claim 9, wherein the device is an application specific integrated circuit or a digital signal processing device, configured to control a user equipment (UE) to operate in a wireless communication system.

* * * * *